US012643254B2

(12) United States Patent
Loverink

(10) Patent No.: US 12,643,254 B2
(45) Date of Patent: Jun. 2, 2026

(54) METHOD AND APPARATUS FOR FORMING IRREGULARLY SHAPED WORK PIECES

(71) Applicant: Woodpeckers, LLC, Strongsville, OH (US)

(72) Inventor: Derwin Loverink, Norton, OH (US)

(73) Assignee: Woodpeckers, LLC, Strongsville, OH (US)

( * ) Notice: Subject to any disclaimer, the term of this patent is extended or adjusted under 35 U.S.C. 154(b) by 232 days.

(21) Appl. No.: 18/595,771

(22) Filed: Mar. 5, 2024

(65) Prior Publication Data

US 2024/0300137 A1 Sep. 12, 2024

Related U.S. Application Data

(60) Provisional application No. 63/489,103, filed on Mar. 8, 2023.

(51) Int. Cl.

| | |
|---|---|
| ***B27B 27/02*** | (2006.01) |
| ***B27B 13/04*** | (2006.01) |
| ***B27B 13/16*** | (2006.01) |

(52) U.S. Cl.
CPC .............. *B27B 27/02* (2013.01); *B27B 13/04* (2013.01); *B27B 13/16* (2013.01)

(58) Field of Classification Search
CPC ......... B27B 13/04; B27B 13/16; B27B 27/00; B27B 27/02; B27B 27/04; B27B 27/08; B27B 27/10; B26B 3/00
USPC ................. 144/144.1, 144.51, 144.52, 145.1
See application file for complete search history.

(56) References Cited

U.S. PATENT DOCUMENTS

| | | | | |
|---|---|---|---|---|
| 1,800,338 A | 4/1931 | Chapman | | |
| 3,442,309 A * | 5/1969 | Jentsch | B23Q 9/0078 | 144/144.1 |
| 5,038,646 A * | 8/1991 | Suwitoadji | B23D 55/046 | 144/144.1 |
| 6,095,726 A * | 8/2000 | Scott | B23D 61/025 | 144/144.1 |
| 2002/0023527 A1* | 2/2002 | Wood | B23D 55/086 | 83/788 |

* cited by examiner

*Primary Examiner* — Phong H Nguyen
(74) *Attorney, Agent, or Firm* — Sand, Sebolt & Wernow Co., LPA

(57) ABSTRACT

A band saw template jig configured to be used with a band saw for cutting a desired pattern in a work piece by guiding an attached template at a desired offset. The band saw template jig includes at least a base, at least one support shaft, a guide arm, and a guide end. The base is adapted to be secured onto a work surface using at least one securement member. The at least one support shaft operably engages with the base. The guide arm and guide end are collectively movable along the at least one support shaft and are adapted to be secured at a desired height on the at least one support shaft. The guide end is configured to allow a band saw blade to be positioned inside of the guide end for setting the desired offset between the work piece and the template attached with the work piece.

13 Claims, 22 Drawing Sheets

METHOD AND APPARATUS FOR FORMING IRREGULARLY SHAPED WORK PIECES

REFERENCE TO RELATED APPLICATIONS

This application claims the benefit of U.S. Provisional Application Ser. No. 63/489,103, filed on Mar. 8, 2023; the disclosure of which is incorporated herein by reference.

TECHNICAL FIELD

This disclosure is directed to a woodworking tool to assist in forming irregularly shaped work pieces with a band saw.

BACKGROUND ART

In woodworking, cutting and forming a pattern along an edge of a work piece requires various tools at a woodworker's disposal. Generally, the woodworker must create a template that mimics a shape and/or pattern that the woodworker desires to cut into at least one edge of work piece. The woodworker then uses this template with the desired irregularly shaped work piece to cut the desired shape and pattern into at least one edge of the work piece by using a bearing guided router. While this technique is commonly used in woodworking projects, cutting a desired pattern into an irregularly shaped work piece or a contoured work piece with only a bearing guided router may be time consuming and tedious to the woodworker given the size, shape, and configuration of the irregularly shaped work piece. With such irregularly shaped work pieces, the woodworker may have to take make multiple cuts along the edge of the irregularly shaped work pieces until the edged of the irregularly shaped work piece matches with or is complementary with the edge of the template.

To address these difficulties and problems, a woodworker may utilize a band saw or similar reciprocating tool to cut a desired pattern into an irregularly shaped work piece or a contoured work piece. While this technique may be desirable for quickly cutting an irregularly shaped work piece, cutting a precise edge at a desired depth along an irregularly shaped work piece that matches with the edge of the template may be extremely difficult for a woodworker without guiding assistance. Some band saw template jigs and other similar assisting devices are commercially available but require additional woodworking devices or tools for assisting the woodworker. Such use of multiple assisting devices with band saw template jigs requires the woodworker to have access to these various assisting devices and/or tools as well as an expenditure of more time and effort when the woodworker is making precise cuts along an edge of an irregularly shaped work piece or a contoured work piece.

SUMMARY OF THE INVENTION

A band saw template jig configured to be used with a band saw for cutting a desired pattern in a work piece by guiding an attached template at a desired offset. The band saw template jig includes at least a base, at least one support shaft, a guide arm, and a guide end. The base is adapted to be secured onto a work surface using at least one securement member. The at least one support shaft operably engages with the base. The guide arm and guide end are collectively movable along the at least one support shaft and are adapted to be secured at a desired height on the at least one support shaft. The guide end is configured to allow a band saw blade to be positioned inside of the guide end for setting the desired offset between the work piece and the template attached with the work piece.

In one aspect, an exemplary embodiment of the present disclosure may provide a band saw template jig, comprising a base; a support shaft operably engaged with the base; a guide arm selectively operatively engageable with the at least one support shaft; and a guide end defining a notch and operably engaged with the guide arm; wherein the notch is adapted to house a portion of a band saw blade for setting a desired offset between a work piece and an attached template.

In another aspect, an exemplary embodiment of the present disclosure may provide that the notch defines a depth measured from a top of the guide end to a base of the guide end; and wherein the portion of the band saw blade is positioned between the tip and the base wall. In another aspect, an exemplary embodiment of the present disclosure may provide that the notch defines a width measured by a distance between a pair of internal lateral walls of the guide end; and wherein the notch is adapted to house a band saw blade having a width between one-eighth of an inch up to one-fourth of an inch. In another aspect, an exemplary embodiment of the present disclosure may provide that the support shaft comprises a top end; a bottom end opposite to the top end and operably engaged with the base; a vertical direction extending between the top end and the bottom end; and wherein the guide arm and guide end are collectively moveable along the support shaft between the top end and a top surface of the base. In another aspect, an exemplary embodiment of the present disclosure may provide at least one height adjustment knob configured to secure the at least one support shaft at a desired height relative to the base. In another aspect, an exemplary embodiment of the present disclosure may provide that the guide arm comprises a first end, a second end opposite to the first end, a set of openings defined in the guide arm between the first end and the second end, and wherein the set of openings is configured to receive and house at least a portion of the at least one support shaft. In another aspect, an exemplary embodiment of the present disclosure may provide that the guide arm further comprises a first pair of openings defined in the guide arm between the first end and the second end, and a second pair of openings defined in the guide arm between the first end and second end and the first pair of openings. In another aspect, an exemplary embodiment of the present disclosure may provide a first distance measured between the guide end and the base when the support shaft is engaged with the guide arm at the first pair of openings, a second distance measured between the guide end and the base when the support shaft is engaged with the guide arm at the second pair of openings, and wherein the second distance is greater than the first distance. In another aspect, an exemplary embodiment of the present disclosure may provide a second support hafts operably engaged with the base and configured with the base in an identical orientation as to the support shaft. In another aspect, an exemplary embodiment of the present disclosure may provide that the guide arm further comprises a first pair of openings extending though the guide arm, a second pair of openings extending through the guide arm, wherein each one of the first pair of openings are configured to receive and house at least a portion of the first support shaft of the second support shaft in a first structural arrangement, and wherein each one of the second set of openings are configured to receive and house at least a portion of the first support shaft or the second support shaft in a second structural arrangement. In another aspect, an exemplary embodiment of the present disclosure may provide guide arm further comprises a set of apertures defined in the guide arm and is in fluid communication with the set of openings, and wherein the at least one height adjustable knob threadably engages with the guide arm inside one of the apertures of the set of apertures to secure the guide arm with the support shaft. In another aspect, an exemplary embodiment of the present disclosure may provide that the guide arm comprises an inset configured to operably engage with the guide end. In another aspect, an exemplary embodiment of the present disclosure may provide that the guide end is removably secured to the inset of the guide arm via at least one guide end fastener. In another aspect, an exemplary embodiment of the present disclosure may provide at least one securement member operably engaged with the base and operatively engageable with a band saw table. In another aspect, an exemplary embodiment of the present disclosure may provide that the at least one securement member magnetically engages the base.

In one aspect, an exemplary embodiment of the present disclosure may provide method for guiding a template to cut a work piece, the method comprising steps of attaching a template to a work piece, operatively engaging a band saw template jig with a band saw, positioning a guide end of the band saw template jig unit at a desired offset relative to a band saw blade of the band saw, securing the band saw template jig to a work surface, introducing the work piece and the template to the table of the band saw, and guiding the template, via the guide end, to cut the work piece at the predetermined distance.

In another aspect, an exemplary embodiment of the present disclosure may provide positioning a guide arm of the band saw template jig in a first structural arrangement or a second structural arrangement relative to a first support shaft and a second support shaft of the band saw template jig. In another aspect, an exemplary embodiment of the present disclosure may provide determining the guide arm of the band saw template jig needing to be in the first structural arrangement and inserting the first support shaft and the second support shaft into a first pair of openings defined in the guide arm. In another aspect, an exemplary embodiment of the present disclosure may provide determining the guide arm of the band saw template jig needing to be in the second structural arrangement and inserting the first support shaft and the second support shaft into a second pair of openings defined in the guide arm. In another aspect, an exemplary embodiment of the present disclosure may provide determining a desired height of the guide arm, moving the guide arm vertically along the first support shaft and the second support shaft, and releasably securing the guide arm at the desired height.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
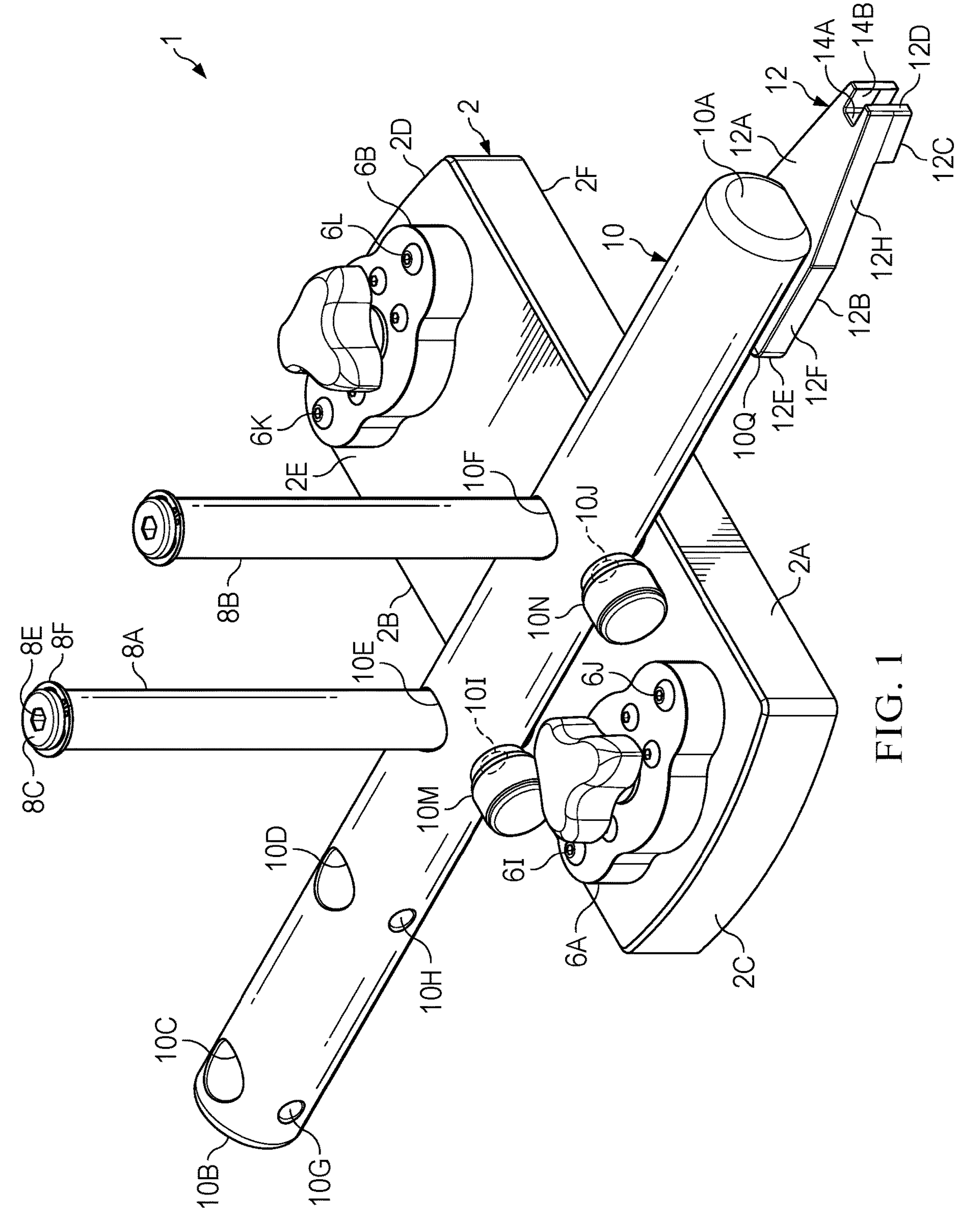
FIG. 1 (FIG. 1) is top, front, left isometric perspective view of a band saw template jig in accordance with an aspect of the present disclosure, wherein the guide arm is illustrated in a first structural arrangement.

A new band saw template jig of the present disclosure depicted through FIGS. 1-19 is shown generally as FIG. 1 and is generally referred to as 1. As described in greater detail below, the band saw template jig 1 assists a woodworker with the use of a template for cutting wood with a band saw.

FIGS. 1-13 illustrates a band saw template jig 1 for use with a band saw. As described in greater detail below, the band saw template jig 1 enables a woodworker to guide an irregularly shaped work piece through a band saw blade of the band saw while riding along an edge of a desired template to cut a matching edge in the irregularly shaped work piece. Such components and parts of the band saw template jig 1 are described in greater detail below.

Band saw template jig 1 includes a base 2 that is configured to rest on a band saw table of a band saw. Referring to FIG. 1, base 2 includes a front end 2A, a rear end 2B opposite to the front end 2A, and a longitudinal axis defined therebetween. Base 2 also generally includes a left side or first side 2C, a right side or second side 2D opposite to the left side 2C, and a transverse axis defined therebetween. Base 2 also generally includes a top end or first end 2E, a bottom end or second end 2F opposite to the top end 2E, and a vertical axis defined therebetween.

Figure 9:
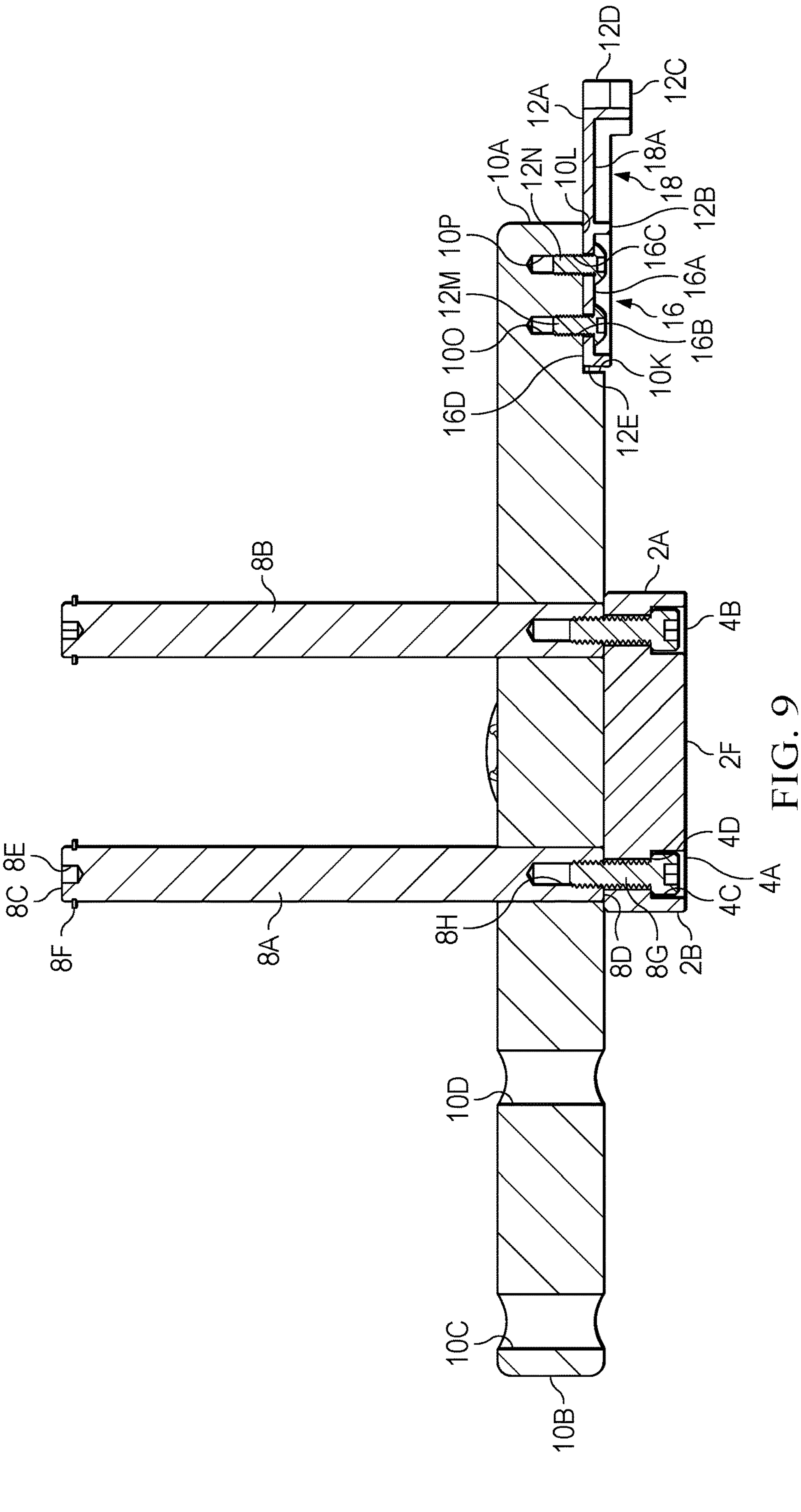
FIG. 9 (FIG. 9) is a longitudinal cross-section of a guide arm of the band saw template jig taken in the direction of line 9-9 of FIG. 6.

Base 2 also defines at least one bottom end inset that extends upwardly from bottom end 2F and into the base 2. As best seen in FIG. 9, base 2 defines a first bottom end inset 4A that extends upwardly from bottom end 2F and into the base 2. The base 2 also defines a second bottom end inset 4B that extends upwardly from bottom end 2F and into the base 2 and is adjacent to first bottom end inset 4A. The first bottom end inset 4A and the second bottom end inset 4B is collectively defined by a side wall 4C and a top wall 4D that is substantially perpendicular to the side wall 4C. While not illustrated herein, the second bottom end inset 4B is also collectively defined by a side wall 4C and a top wall 4D that is substantially perpendicular to the side wall 4C.

Figure 7:
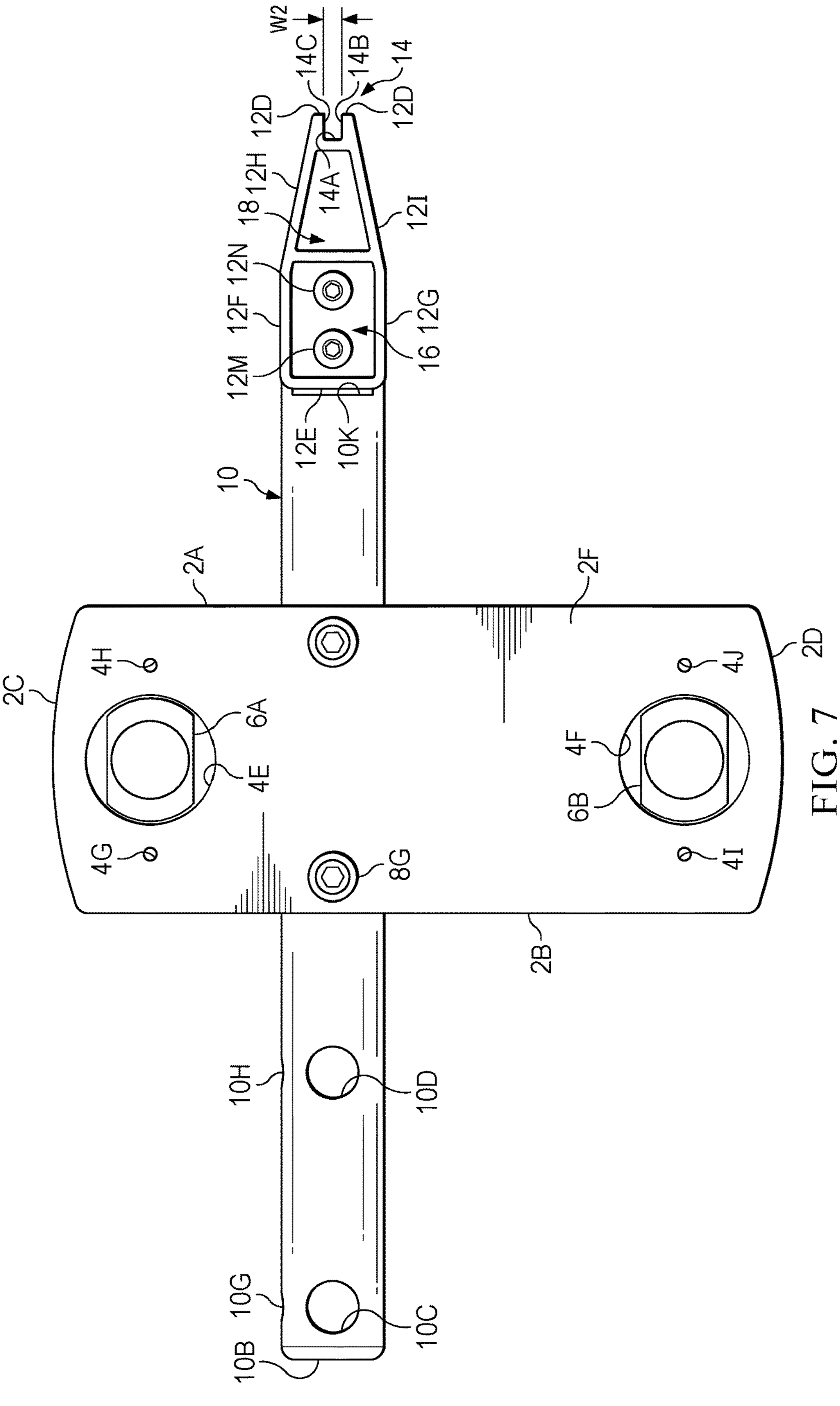
FIG. 7 (FIG. 7) is a bottom plan view of the band saw template jig of FIG. 1.

Base 2 also defines at least one securement member opening extending upwardly from the bottom end 2F of the base 2 to the top end 2E of the base 2. Referring now to FIG. 7, the base 2 defines a first securement member opening 4E that extends upwardly from the bottom end 2F of the base 2 to the top end 2E of the base 2. Base 2 also defines a second securement member opening 4F that extends upwardly from the bottom end 2F of the base 2 to the top end 2E of the base 2 and is opposite to the first securement member opening 4E.

Figure 8:
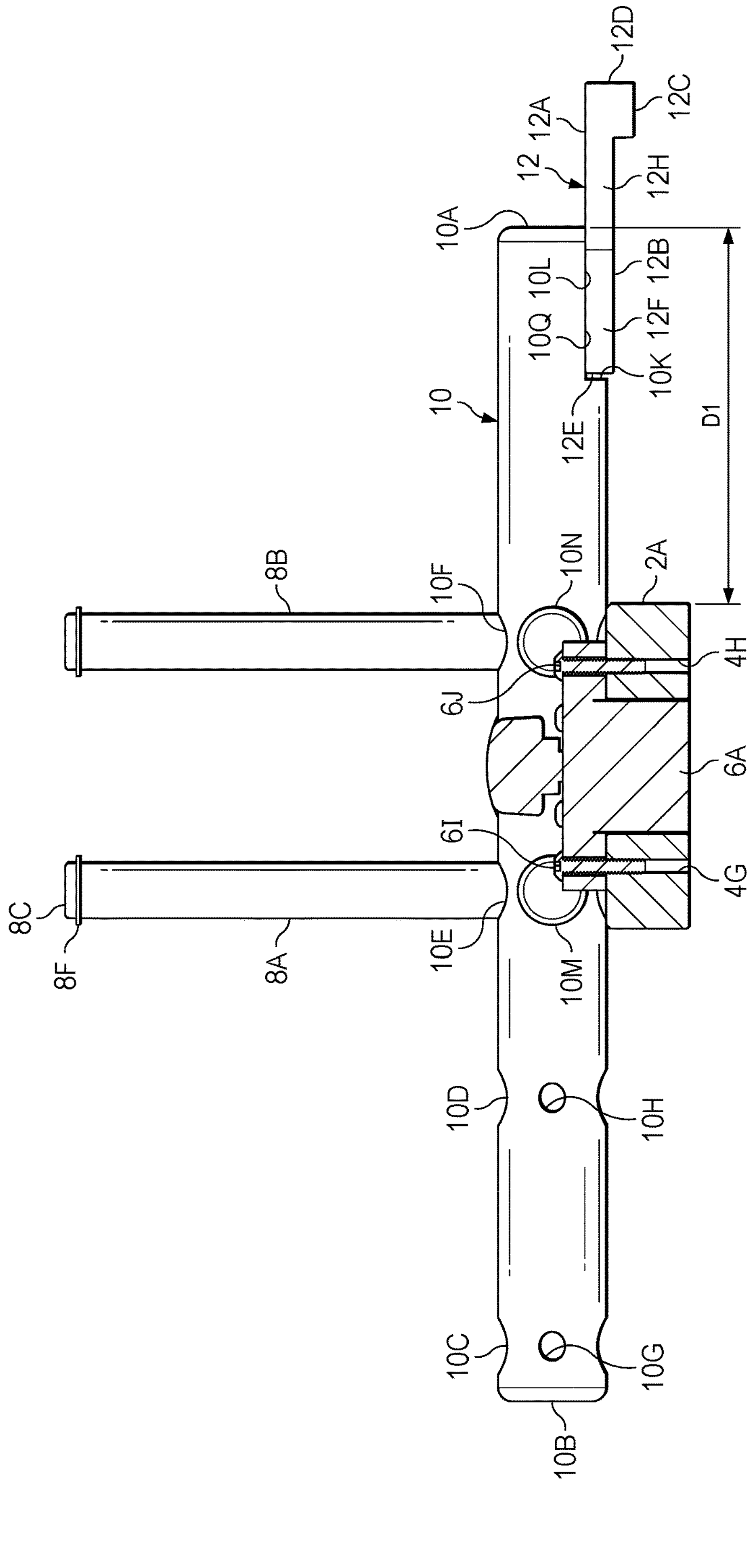
FIG. 8 (FIG. 8) is a longitudinal cross-section of a base of the band saw template jig taken in the direction of line 8-8 of FIG. 6.

Base 2 also defines at least one set of threaded passageways that extends upwardly from the bottom end 2F of the base 2 to the top end 2E of the base 2. As best seen in FIGS. 7 and 8, base 2 further defines a first set of threaded passageways 4G, 4H that extends upwardly from the bottom end 2F of the base 2 to the top end 2E of the base 2. Base 2 further defines a second set of threaded passageways 4I, 4J that extends upwardly from the bottom end 2F of the base 2 to the top end 2E of the base 2 and is opposite to the first set of threaded passageways 4G, 4H.

Figure 10:
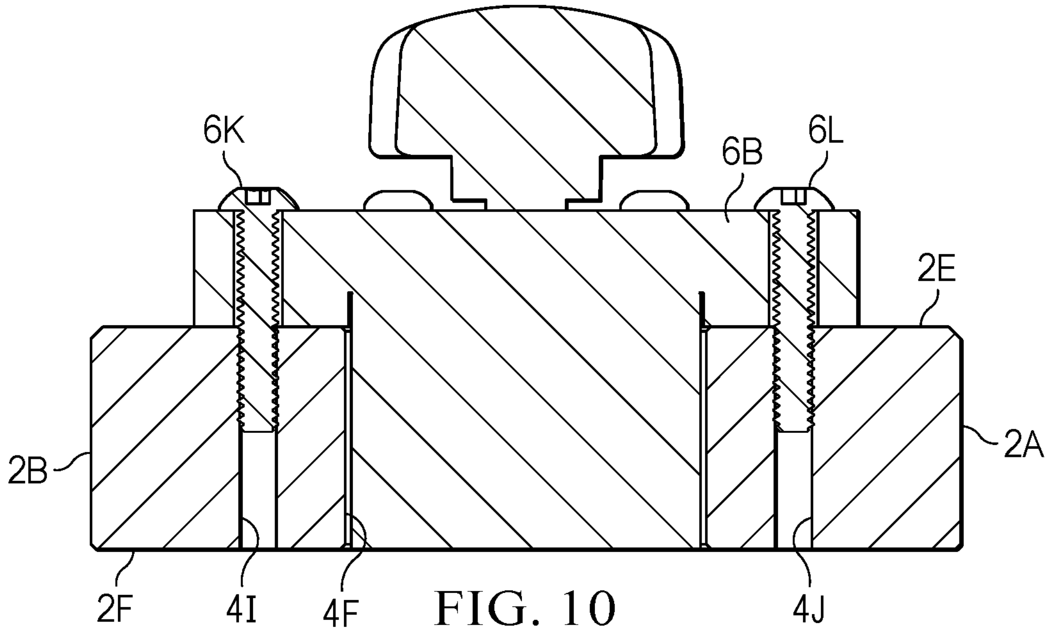
FIG. 10 (FIG. 10) is a longitudinal cross-section of the base taken in the direction of line 10-10 of FIG. 6.
Figure 11:
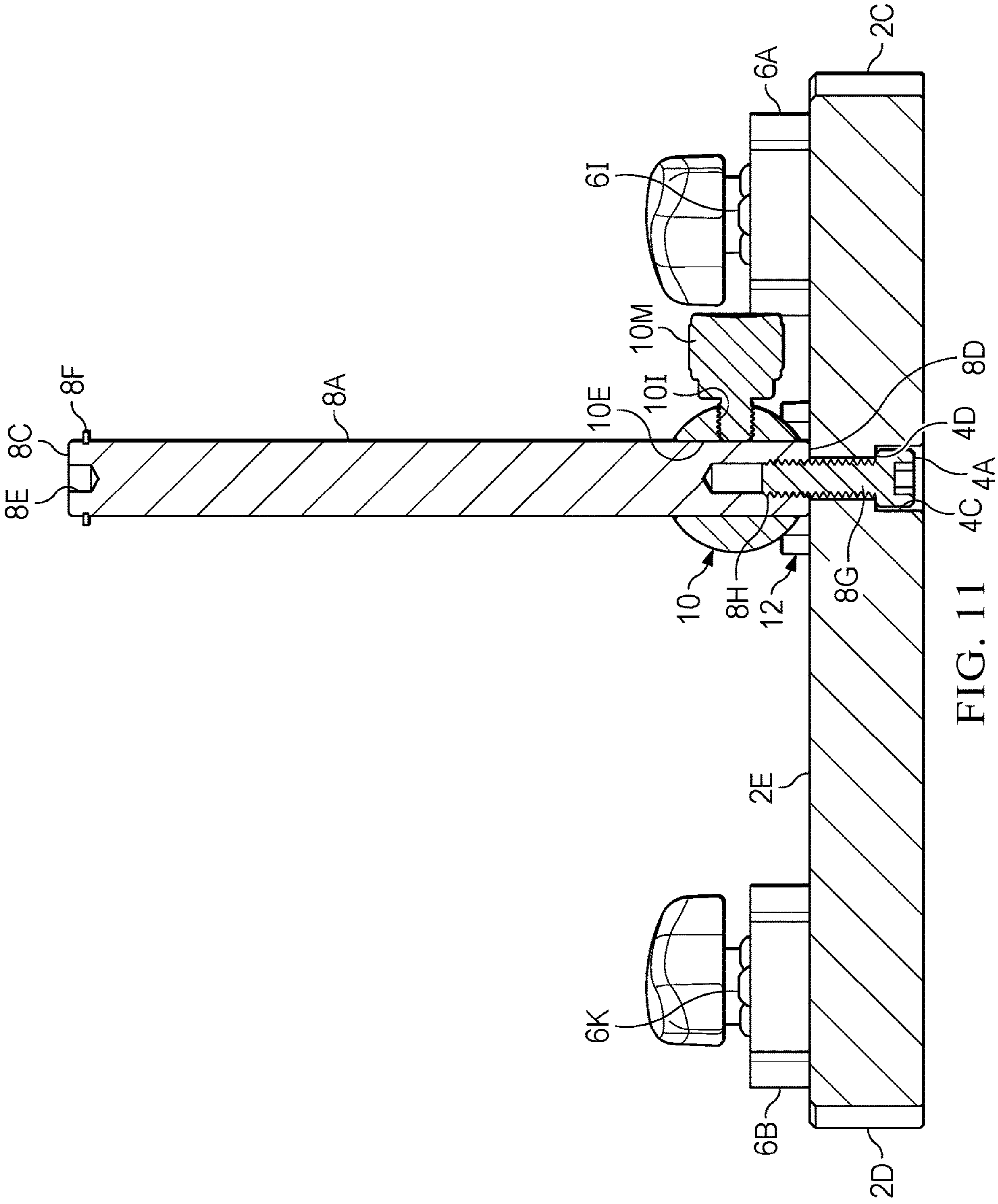
FIG. 11 (FIG. 11) is a transverse cross-section of the band saw template jig taken in the direction of line 11-11 of FIG. 6.
Figure 12:
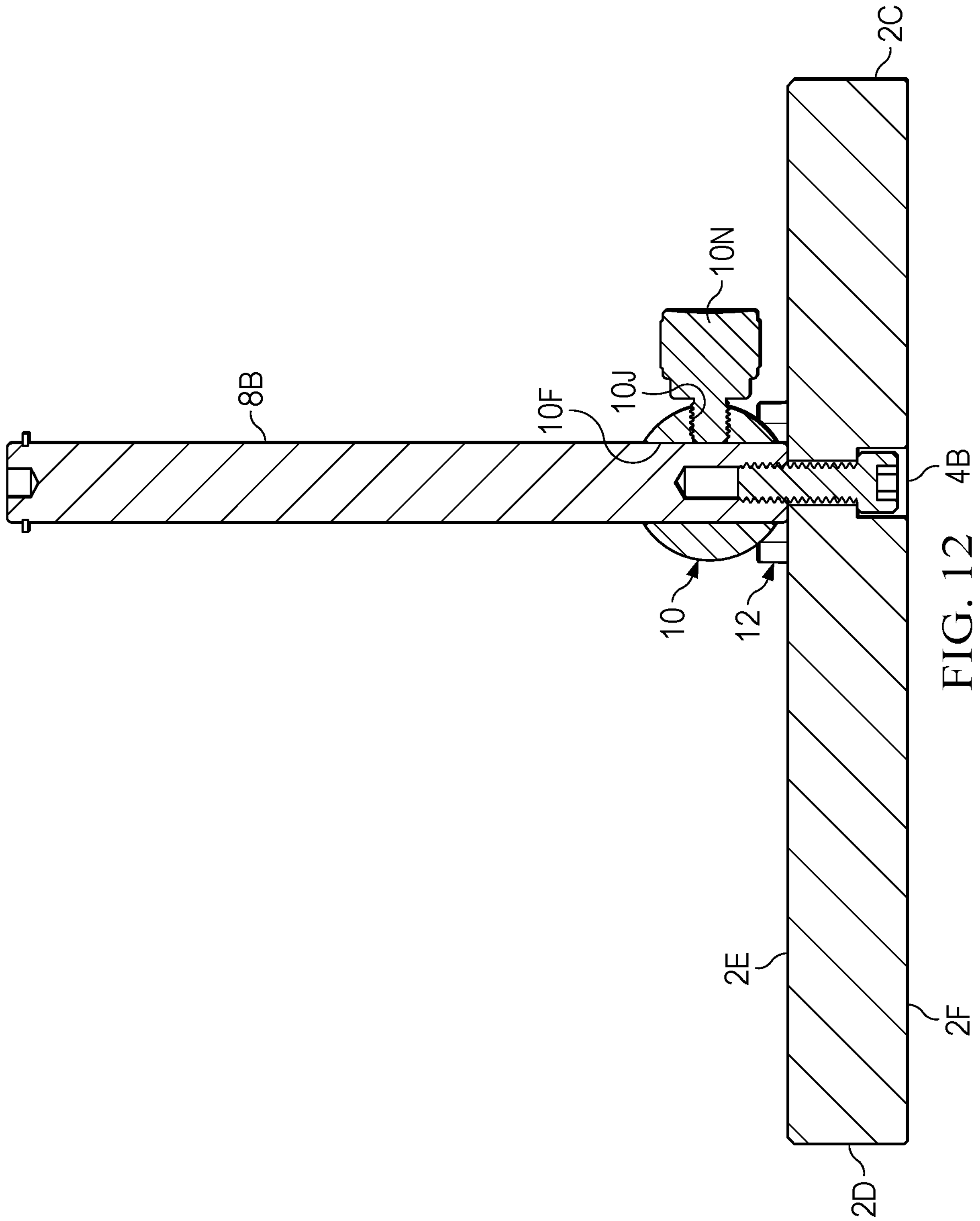
FIG. 12 (FIG. 12) is a transverse cross-section of the band saw template jig taken in the direction of line 12-12 of FIG. 6.
Figure 13:
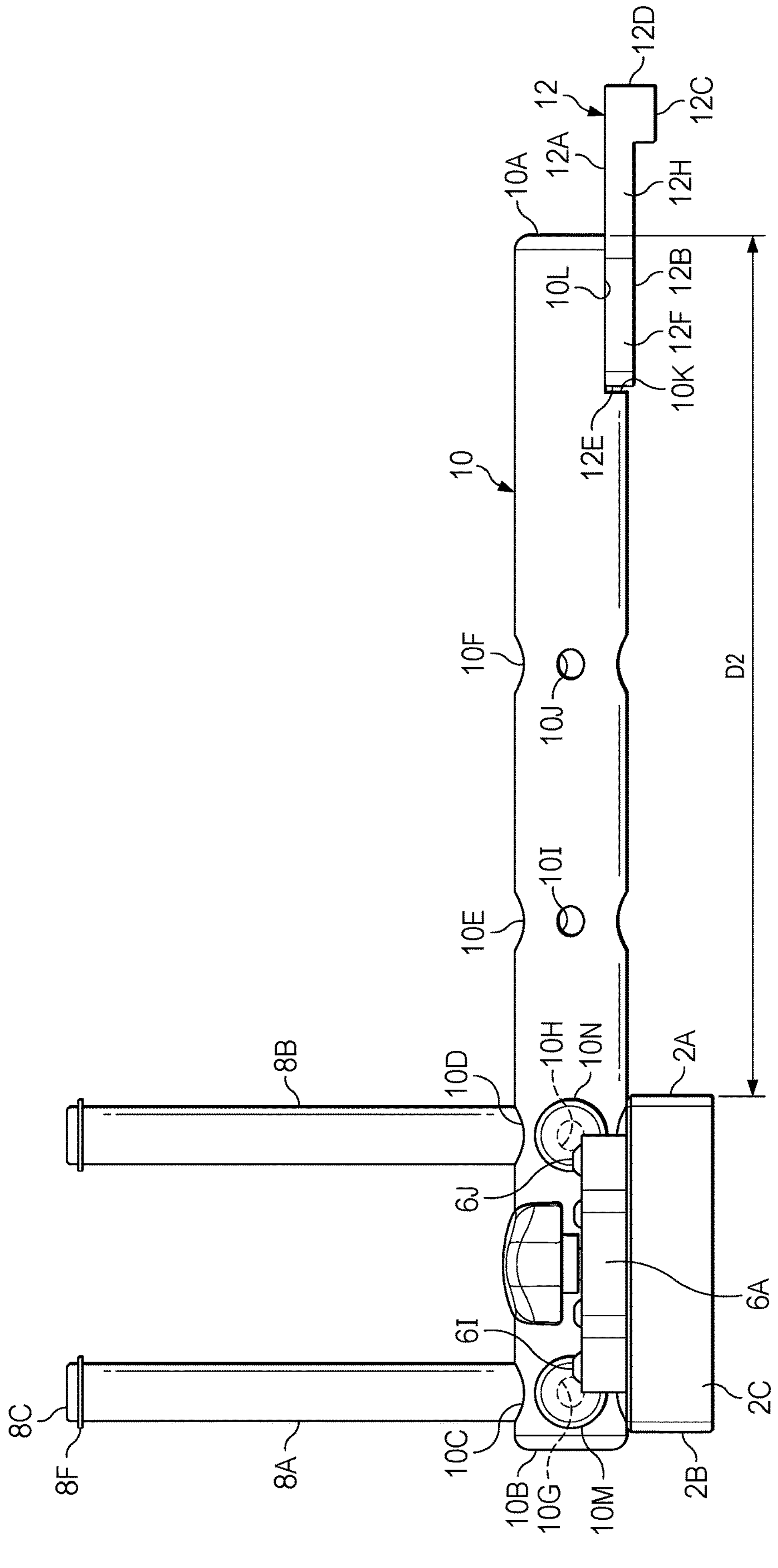
FIG. 13 (FIG. 13) is a left elevation view of the band saw template jig, wherein guide arm is provided in second position.

Band saw template jig 1 also includes at least one securement member 6 that operably engages with the base 2 via one of the at least one securement member openings (e.g., first securement member opening 4E or second securement member opening 4F). As best seen in FIGS. 7, 8, and 10, base saw template jig 1 includes a first securement member 6A that operably engages with the base 2 via the first securement member openings 4E, and a second securement member 6B that operably engages with the base 2 via the second securement member openings 4F. Inasmuch as the first securement member 6A and the second securement member 6B are substantially similar to one another, the following description will relate to the first securement member 6A. It should be understood, however, that while the securement member 6A is being described herein, the description of the first securement member 6A applies equally to a subsequent securement member, such as second securement member 6B.

Referring to FIGS. 1 and 4-7, the first securement member 6A is positioned internal to a radial innermost point of the first securement member opening 4E. A set of securement member fasteners 6C is threadably engaged through the first set of threaded passageways 4G, 4H with the base 2 in order to secure the first securement member 6A with the base 2. Similarly, the second securement member 6B is positioned internal to a radial innermost point of the second securement member opening 4F. A set of securement member fasteners 6D is threadably engaged through the second set of threaded passageways 4I, 4J with the base 2 in order to secure the second securement member 6B with the base 2.

As illustrated herein, the first securement member 6A and the second securement member 6B in the present disclosure configured to releasably secure the base 2 with a band saw table of a band saw. Such use of the first securement member 6A and the second securement member 6B enables a woodworker to operably engage the base 2 at any suitable position on the band saw table without attachment restrictions between the base 2 and the band saw table. In the illustrated embodiment, the first securement member 6A and the second securement member 6B in the present disclosure are Magswitch™ Magjigs for magnetically engaging the base 2 with a band saw table of a band saw. Such use of these the first securement member 6A and the second securement member 6B enables the woodworker to magnetically attach the base 2 at any suitable position on the band saw table without attachment restrictions between the base 2 and the band saw table. It should be appreciated, however, that any other securement components or mechanisms may be used with base 2 for releasably securing the base 2 with a band saw table of a band saw.

Band saw template jig 1 also includes at least one support shaft 8 that operably engages with the base 2. As best seen in FIGS. 1 and 9, band saw template jig 1 includes a first support shaft 8A and a second support shaft 8B that operably engages with the base 2. In the illustrated embodiment, the first support shaft 8A and the second support shaft 8B are substantially similar to one another and are configured with the base 2 in an identical orientation. Inasmuch as the first support shaft 8A and the second support shaft 8B are substantially similar to one another, the following description will relate to the first support shaft 8A. It should be understood, however, that while the first support shaft 8A is being described herein, the description of the first support shaft 8A applies equally to a subsequent support shaft, such as second support shaft 8B.

As best seen in FIG. 9, the first support shaft 8A generally includes a top end or first end 8C, a bottom end or second end 8D opposite to the top end 8C, and a vertical axis defined therebetween. The first support shaft 8A further includes bearing 8F closer to the top end 8C than the bottom end 8D; such use and purpose of the bearing 8F is described in greater detail below. The first support shaft 8A also defines a recess 8E that extends downwardly into the support shaft 8A from the top end 8C towards the bottom end 8D along the vertical axis of the first support shaft 8A. The first support shaft 8A also defines a threaded opening 8H that extends upwardly into the support shaft 8A from the bottom end 8D towards the top end 8C along the vertical axis of the first support shaft 8A.

Still referring to FIG. 9, the first support shaft 8A also operably engages with the base 2 by a support shaft fastener 8G that threadably engages with the first bottom end inset passageway 4A and the threaded opening 8H. Once secured with the base 2, the first support shaft 8A is positioned substantially perpendicular to the top end of the base 2 where the bottom end 8D of the first support shaft 8A is contiguous to the top end 2E of the base 2. As seen in FIG. 9, an innermost radial point of the threaded opening 8H of the support shaft 8A and the innermost radial point of first bottom end inset passageway 4A of the base 2 are substantially aligned with one another.

As described above, the features and components of the first support shaft 8A applies equally to features and components of the second support shaft 8B. Additionally, the engagement between the first support shaft 8A and the base 2 also applies equally to the engagement between the second support shaft 8B and the base 2.

Band saw template jig 1 also includes a guide arm 10 that slideably engages with at least one support shaft 8 where the guide arm 10 is moveable along the vertical axis of the at least one support shaft 8. As best seen in FIG. 1, the guide arm 10 slideably engages with the first support shaft 8A and the second support shaft 8B where the guide arm 10 where the guide arm 10 is moveable along the vertical axes of the first support shaft 8A and the second support shaft 8B. Such features and components of the guide arm 10 are described in greater detail below.

Figure 19:
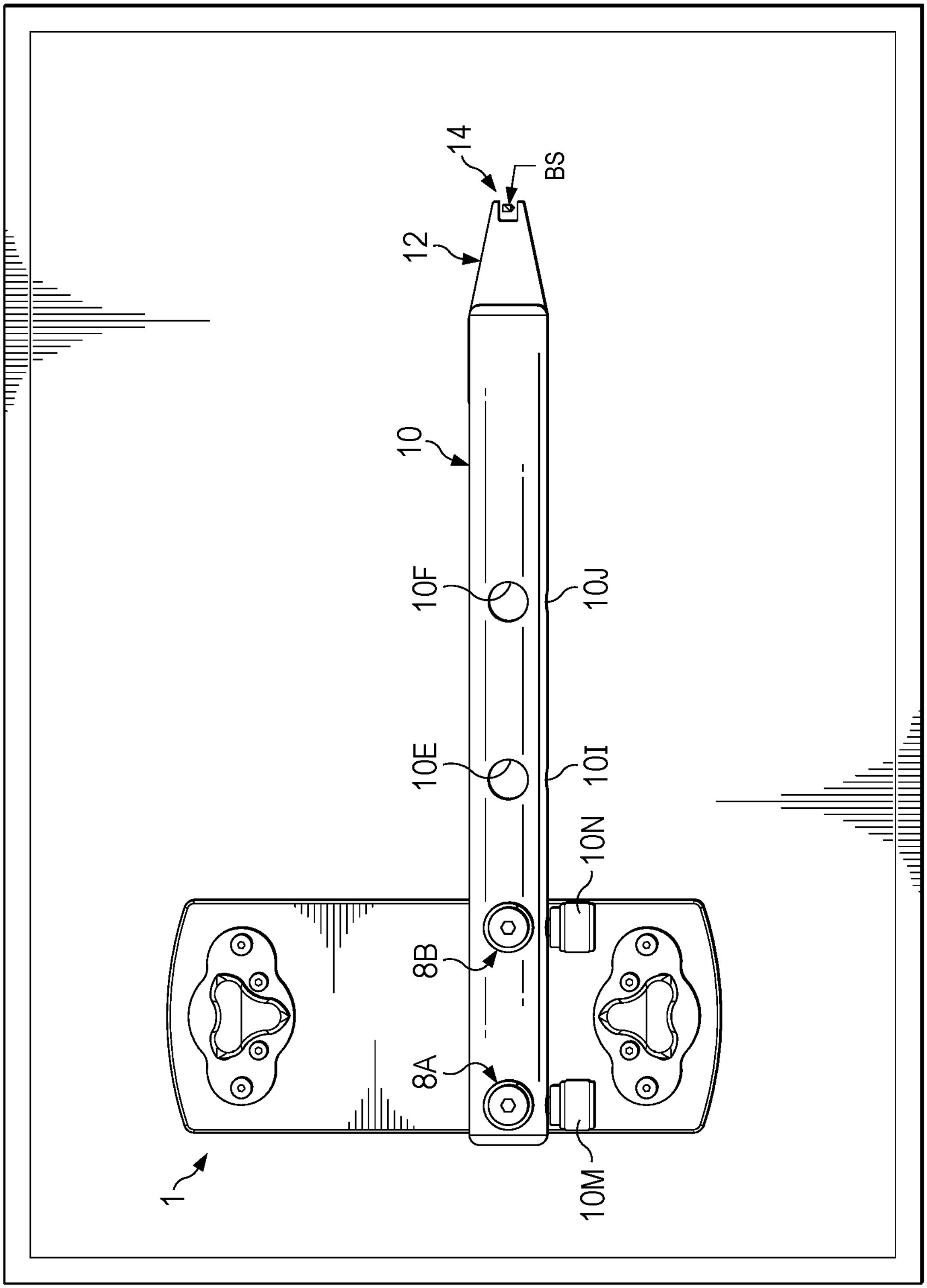
FIG. 19 (FIG. 19) is another operational view of band saw template jig wherein guide arm is provided in a second structural arrangement.

Referring now to FIG. 1, the guide arm 10 includes a front end or first end 10A, a rear end or second end 10B opposite to the front end 10A, and a longitudinal axis defined therebetween. The guide arm 10 further defines a set of openings 10C, 10D, 10E, 10F that extends entirely through the guide arm 10 along an axis that is substantially perpendicular to the longitudinal axis of the guide arm 10. As best seen in FIG. 19, the set of openings 10C, 10D, 10E, 10F includes a first pair of openings 10C, 10D that are configured to receive and house a portion of the first support shaft 8A and a portion of the second support shaft 8B in a first structural arrangement. As best seen in FIG. 1, the set of openings 10C, 10D, 10E, 10F includes a second pair of openings 10E, 10F that are configured to receive and house a portion of the first support shaft 8A and a portion of the second support shaft 8B in a second structural arrangement. Depending on the size of the work piece that is being cut, a woodworker may select between the first pair of openings 10C, 10D and the second pair of openings 10E, 10F when installing the guide arm 10 with the first support shaft 8A and the second support shaft 8B.

Referring now to FIG. 1, the guide arm 10 further defines a set of apertures 10G, 10H, 10I, 10J that extends entirely through the guide arm 10 along an axis that is substantially perpendicular to the longitudinal axis of the guide arm 10. As best seen in FIG. 19, the set of apertures 10G, 10H, 10I, 10J includes a first pair of apertures 10G, 10H that are configured to receive and house portions of height adjustment knobs in a first structural arrangement, which are described in greater detail below. The first pair of apertures 10G, 10H is also in fluid communication with the first pair of openings 10C, 10D of the set of openings 10C, 10D, 10E, 10F. As best seen in FIG. 1, the set of apertures 10G, 10H, 10I, 10J includes a second pair of apertures 10I, 10J that are configured to receive and house portions of height adjustment knobs in a second structural arrangement, which are described in greater detail below. The second pair of apertures 10I, 10J is also in fluid communication with the second pair of openings 10E, 10F of the set of openings 10C, 10D, 10E, 10F. Depending on the size of the work piece that is being cut, a woodworker may select between the first pair of apertures 10G, 10H and the second pair of apertures 10I, 10J when operably engaging height adjustment knobs with the guide arm 10 to maintain the guide arm 10 with the first support shaft 8A and the second support shaft 8B.

Figure 2:
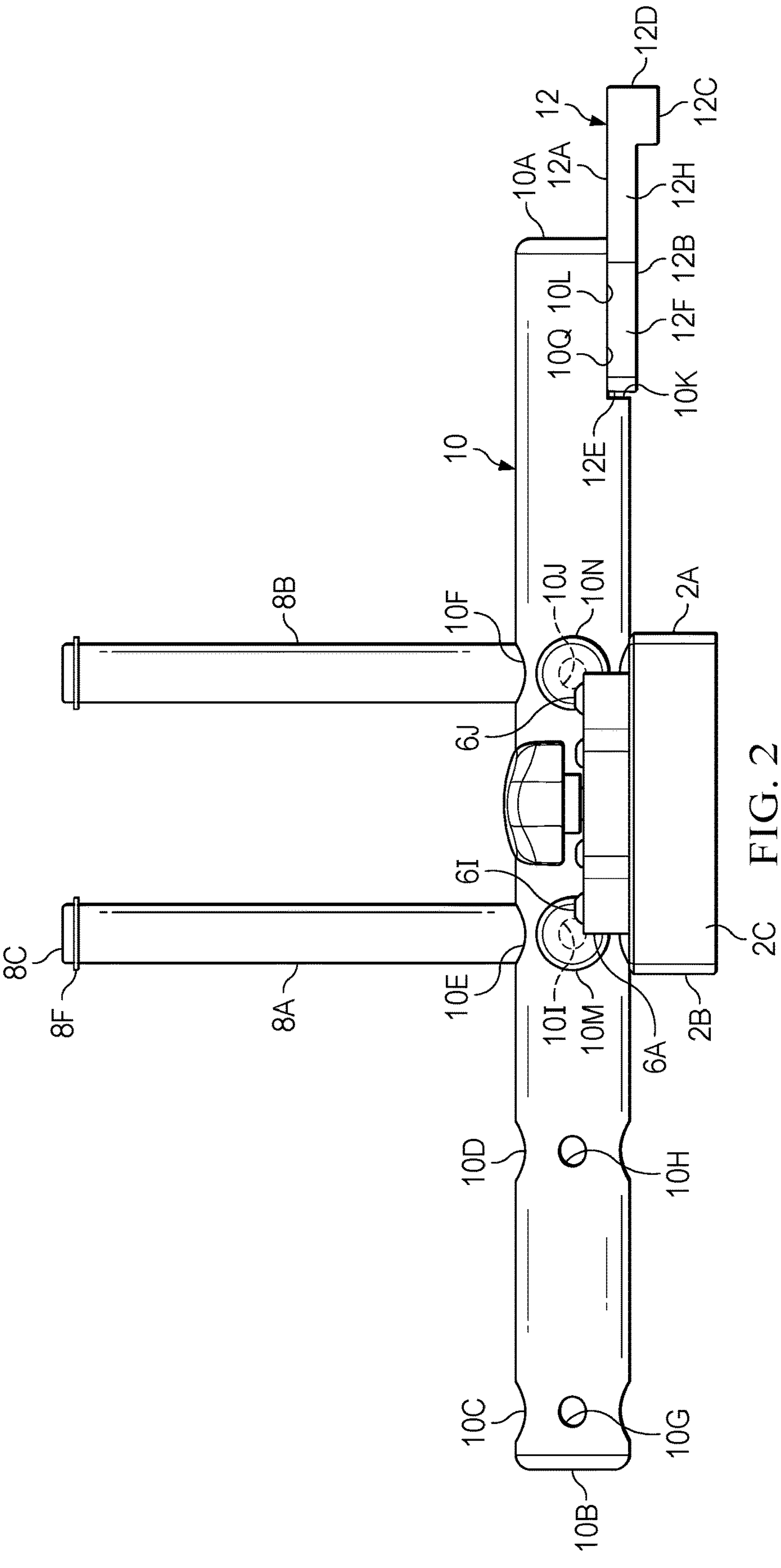
FIG. 2 (FIG. 2) is a left elevation view of the band saw template jig of FIG. 1, wherein the guide arm is provided in a first position.
Figure 3:
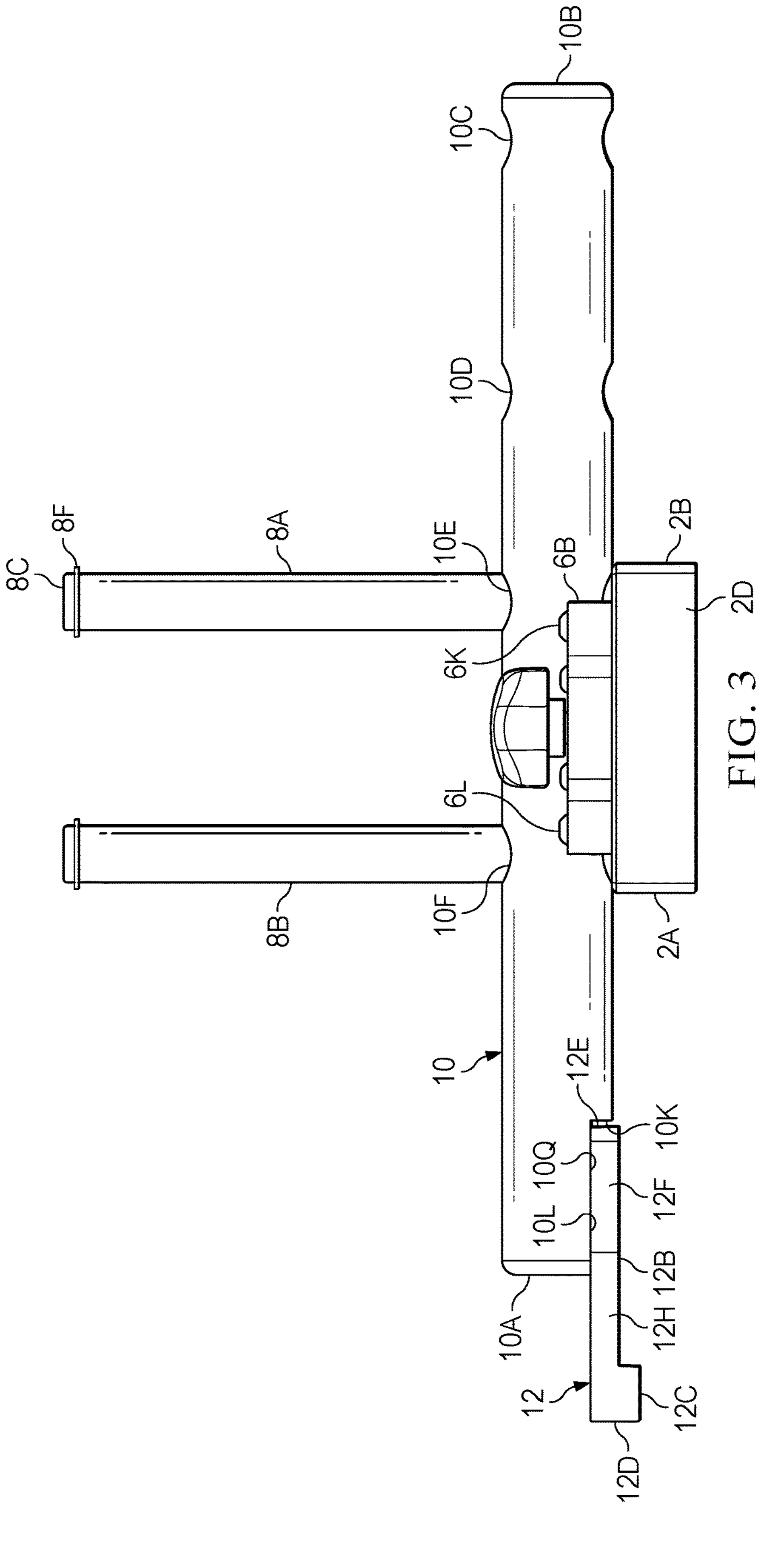
FIG. 3 (FIG. 3) is a right elevation view of the band saw template jig of FIG. 1.
Figure 4:
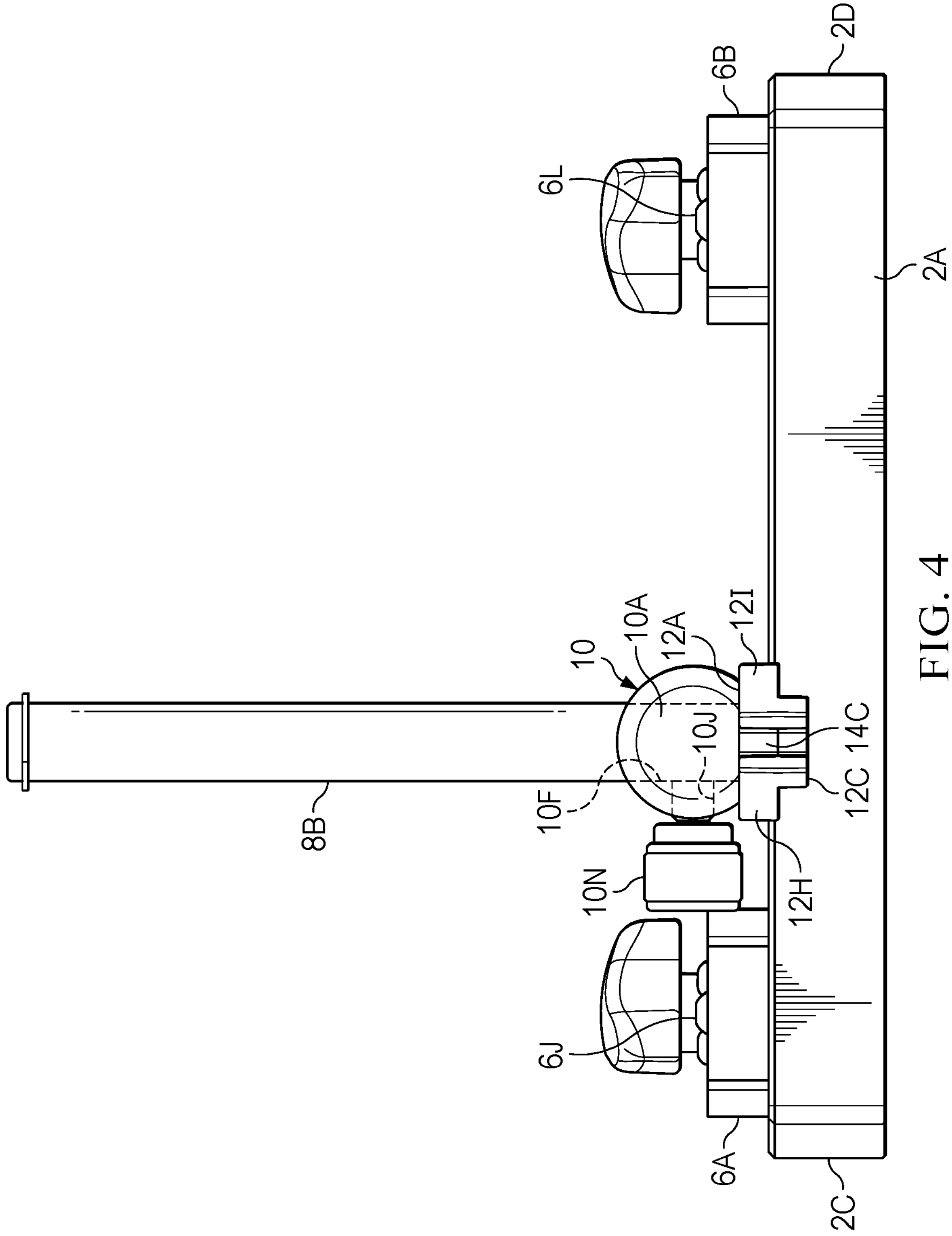
FIG. 4 (FIG. 4) is a front elevation view of the band saw template jig of FIG. 1.
Figure 5:
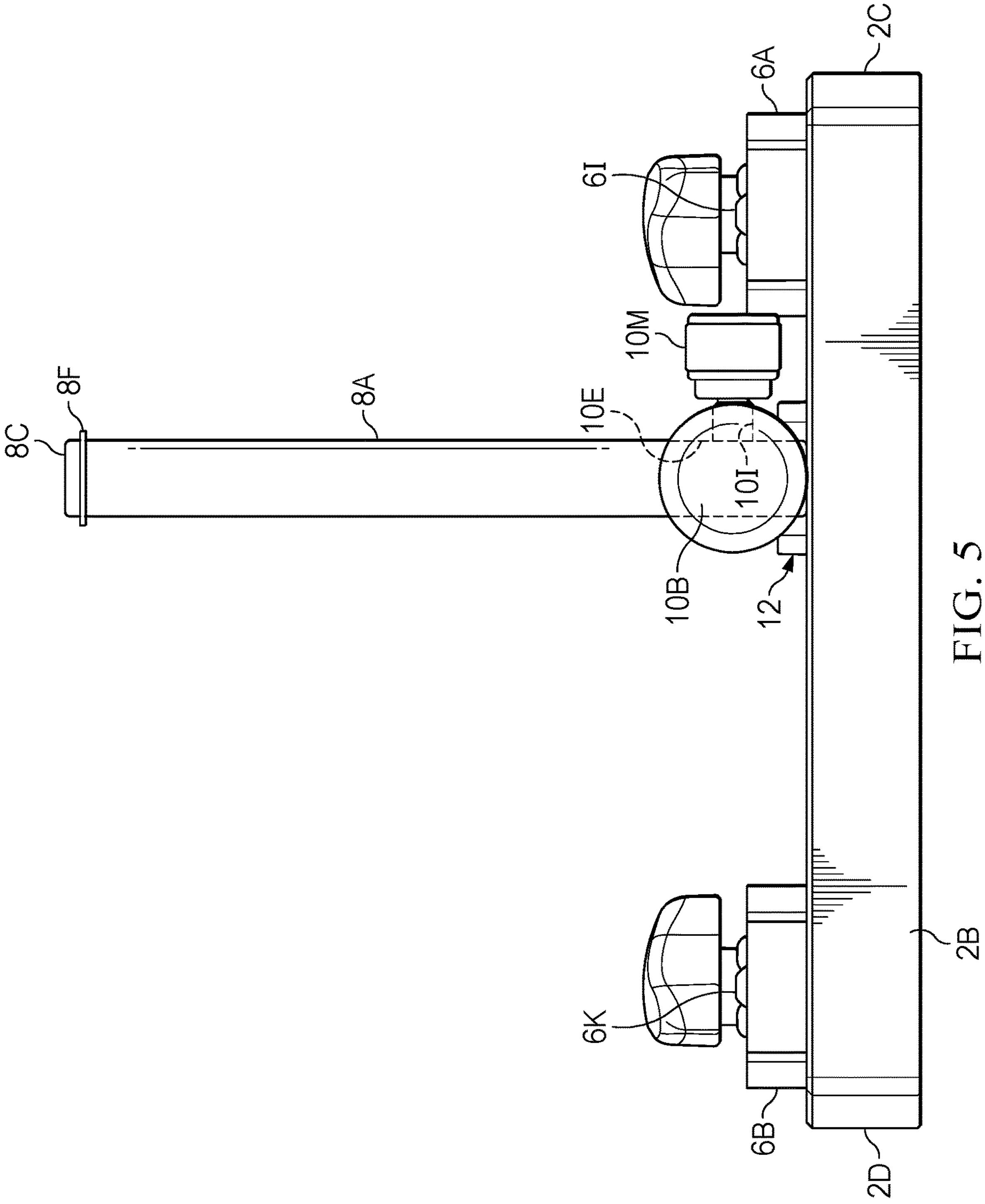
FIG. 5 (FIG. 5) is a rear elevation view of the band saw template jig of FIG. 1.

The guide arm 10 further defines an inset 10Q. As best seen in FIG. 2, the inset 10Q is collectively defined between the front end 10A, a first interior wall 10K longitudinally opposite to the front end 10A, and a second interior wall 10L that extends between the front end 10A and the first interior wall 10K. Referring now to FIG. 9, the guide arm 10 defines at least one threaded opening 10O that extends upwardly from the second interior wall 10L along an axis that is substantially perpendicular to the longitudinal axis of the guide arm 10. Still referring to FIG. 9, the guide arm 10 defines at least another threaded opening 10P that extends upwardly from the second interior wall 10L along an axis that is substantially perpendicular to the longitudinal axis of the guide arm 10; the at least another threaded opening 10P is defined longitudinally opposite to the at least one threaded opening 10O.

Upon configuration of the band saw template jig 1, the guide arm 10 is positioned vertically above the top end 2E of the base 2, wherein front end 10A and rear end 10B of the guide arm 10 are parallel with the front end 2A and rear end 2B of the base 2. The guide arm 10 is also positioned in a way where a singular outermost radial point of the guide arm 10 is substantially parallel with the top end 2E of the base 2 (see FIG. 5). The guide arm 10 is also substantially perpendicular to the first support shaft 8A and the second support shaft 8B such that front end 10A and rear end 10B of the guide arm 10 are substantially perpendicular to the top end 8C and bottom end 8D of the first support shaft 8A and the second support shaft 8B.

As discussed previously, the woodworker may structural arrange the guide arm 10 with the first support shaft 8A and the second support shaft 8B via the first pair of openings 10C, 10D defined in the guide arm 10 or the second pair of openings 10E, 10F defined in the guide arm 10. In a first structural arrangement, the first support shaft 8A and the second support shaft 8B are positioned through openings of the second pair of openings 10E, 10F of the guide arm 10 where the outer surfaces of the first support shaft 8A and the second support shaft 8B are contiguous with interior surfaces of the guide arm 10 inside of the second pair of openings 10E, 10F (see FIG. 9). The guide arm 10 is able to move upward or downward along the longitudinal axes of the first support shaft 8A and the second support shaft 8B. In the first structural arrangement, the guide arm 10 may also be secured with the first support shaft 8A and the second support shaft 8B at a desired height relative to the base 2 by threadably engaging height adjustment knobs 10M, 10N into the corresponding second pair of apertures 10I, 10J. In the first structural arrangement a first distance "D1" (FIG. 8) is defined between the guide arm 10 and base 2. Specifically, first distance is defined between front end 10A of guide arm 10 and front end 2A of base 2.

Similarly, in a second structural arrangement, the first support shaft 8A and the second support shaft 8B are positioned through openings of the first pair of openings 10C, 10D of the guide arm 10 where the outer surfaces of the first support shaft 8A and the second support shaft 8B are contiguous with interior surfaces of the guide arm 10 inside of the first pair of openings 10C, 10D (see FIG. 19). The guide arm 10 is able to move upward or downward along the longitudinal axes of the first support shaft 8A and the second support shaft 8B. In the second structural arrangement, the guide arm 10 may also be secured with the first support shaft 8A and the second support shaft 8B at a desired height relative to the base 2 by threadably engaging the height adjustment knobs 10M, 10N into the corresponding second pair of apertures 10G, 10H. In the second structural arrangement a second distance "D2" (FIG. 13) is defined between the guide arm 10 and base 2. Specifically, second distance "D2" is defined between front end 10A of guide arm 10 and front end 2A of base 2.

Band saw template jig 1 may also include a guide end 12 that operably engages with the guide arm 10. As best seen in FIG. 2, the guide end 12 operably engages with the guide arm 10 at the first end 10A of the guide arm 10 inside of the inset 10Q. During a cutting operation, the guide end 12 is configured to receive and house a band saw blade of a band saw that is free from hindering or preventing any reciprocating movement of the band saw blade. During a cutting operation, the guide end 12 also enables a template to ride along the guide end 12 for cutting a desired edge at a desired depth into an irregularly shaped work piece. Such features and characteristics of the guide end 12 are described in greater detail below.

In the illustrated embodiment, the guide end 12 generally includes a top end or first end 12A, a first section bottom end 12B opposite the top end 12A, and a vertical axis defined therebetween. The guide end 12 generally includes a second section bottom end 12C vertically opposite the top end 12A and positioned vertically below the first section bottom end 12B. The guide end 12 generally includes a front end 12D, a rear end or 12E longitudinally opposite the front end 12D, and a longitudinal axis defined therebetween. Referring now to FIG. 7, the guide end 12 further includes a first section left side 12F, a first section right side 12G transversely opposite to the first section left side 12F, and a transverse axis defined therebetween. The guide end 12 further includes a second section left side 12H, a second section right side or second side 12I transversely opposite the second section left side 12H, and a transverse axis defined therebetween.

Figure 6:
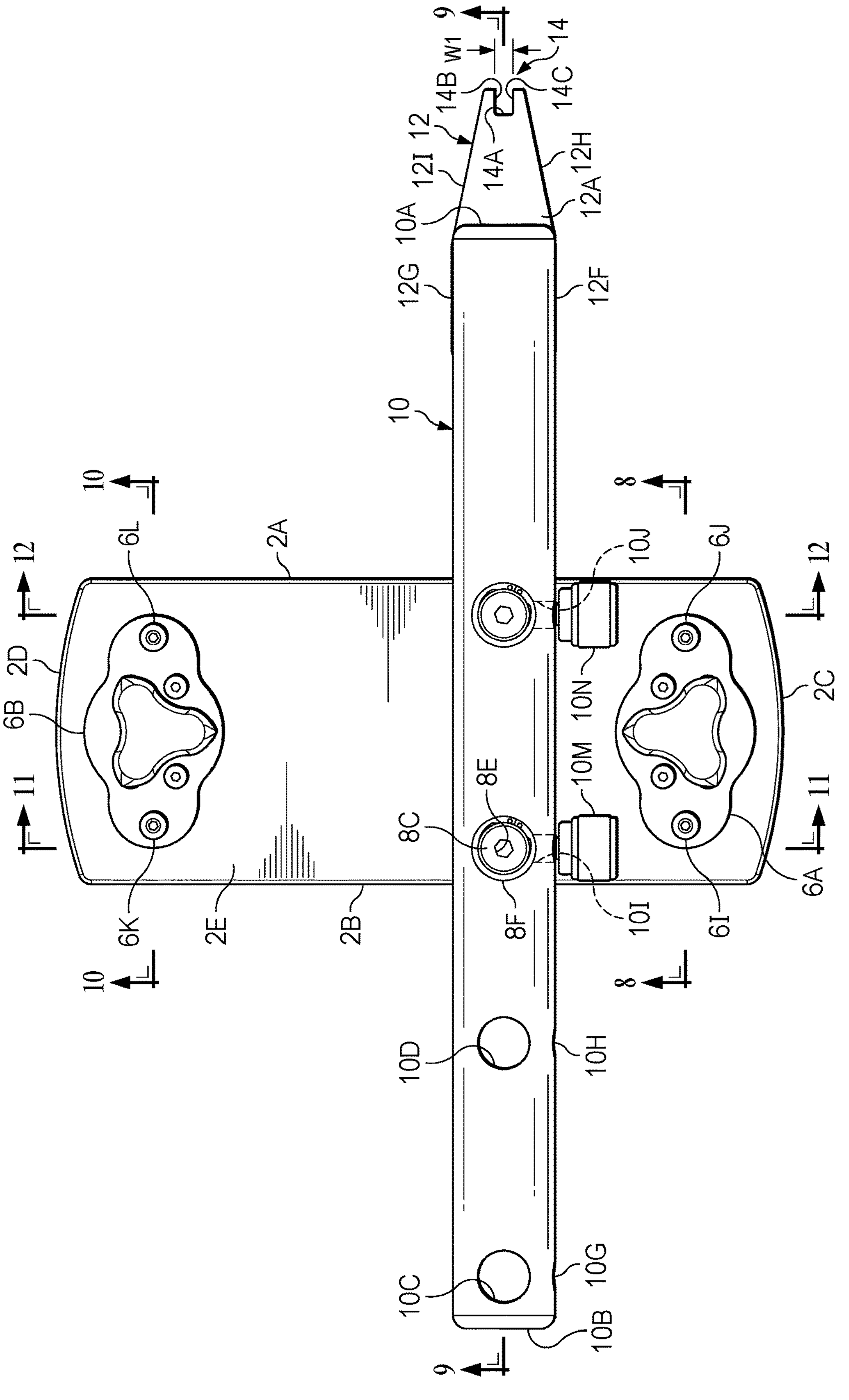
FIG. 6 (FIG. 6) is a top plan view of the band saw template jig of FIG. 1.

The guide end 12 also defines a notch 14 that extends longitudinally from the front end 12D to a base wall 14A. As best seen in FIGS. 6 and 7, the guide end 12 bifurcates into a pair of internal lateral walls 14B, 14C spaced apart from one another via the notch 14. As described in more detail below, the notch 14 is configured to receive and house a portion of a band saw blade of a band saw for cutting operations. Notch 14 defines a first width "W1" (FIGS. 6 and 7) measured by a distance between each of the pair of internal lateral walls 14B, 14C of the guide end 12. The first with "W1" of notch 14 is of a width capable to house the portion of the band saw blade having a width between one-eighth of an inch up to one-fourth of an inch between the pair of internal lateral walls 14B, 14C.

The guide end 12 also defines a first recess 16 that extends upwardly from the first section bottom end toward 12B towards the top end 12A. As best seen in FIG. 9, the first recess 16 extends upwardly from first section bottom end toward 12B to a first base wall 16A vertically opposite to the first section bottom end 12B of the guide end 12. The guide end 12 also defines a first threaded opening 16B that extends upwardly from the first base wall 16A of the guide end 12 to the top end 12A of the guide end 12 such that the top end 12A and the first base wall 16A are in fluid communication with one another via the first threaded opening 16B. Similarly, guide end 12 also defines a second threaded opening 16C that extends upwardly from the first base wall 16A of the guide end 12 to the top end 12A of the guide end 12 such that the top end 12A and the first base wall 16A are in fluid communication with one another via the second threaded opening 16C.

Referring now to FIG. 9, the guide end 12 further defines a second recess 18 that extends from the second section bottom end 12C towards the top end 12A. As best seen in FIG. 9, the second recess 18 extends upwardly from first section bottom end toward 12B to a second base wall 18A vertically opposite to the first section bottom end 12B of the guide end 12.

Upon assembly, the top end 12A of the guide end 12 directly abuts with the second interior wall 10L of the guide arm 10 (see FIG. 9). As best seen in FIG. 9, a portion of the guide end 12 is housed inside of the inset 10Q defined by the guide arm 10. The guide end 12 also operably engages with the guide arm 10 via at least one guide end fastener that threadably engages the guide arm 10 and the guide end 12 with one another. As best seen in FIG. 9, a first guide end fastener 12M threadably engages the guide arm 10 and the guide end 12 with one another via the first threaded opening 10O defined in guide arm 10. Similarly, a second guide end fastener 12N threadably engages the guide arm 10 and the guide end 12 with one another via the second threaded opening 10P defined in guide arm 10.

The band saw template jig 1 is considered advantageous at least because the band saw template jig 1 enables a woodworker to cut an irregularly shaped work piece along a template with precise and accurate cuts at a desired depth. The band saw template jig 1 also enables a woodworker to cut various sizes of irregularly shaped work piece with a band saw by simply arranging the first support shaft 8A and the support 8B in either the first pair of openings 10C, 10D or the second pair of openings 10E, 10F of the set of openings 10C, 10D, 10E, 10F. The band saw template jig 1 also enables a woodworker to cut various thicknesses of irregularly shaped work piece with a band saw by simply raising or lowering the guide arm 10 along the first support shaft 8A and the second support shaft 8B to match the thickness of the work piece. The band saw template jig 1 also enables a woodworker to quickly set a desired depth of cutting into the work piece by operably engaging the first securement member 6A and the second securement member 6B with the band saw table of the band saw (i.e., magnetically engaging the base 2 with the band saw table of the band saw via the first securement member 6A and the second securement member 6B).

Prior to operation, the band saw template jig 1 is assembled by positioning first support shaft 8A atop the base 2. The woodworker secures the first support shaft 8A to the base 2 by securing the support shaft fastener 8G through the first bottom end inset 4A and into threaded opening 8H. To allow for easier securement, the woodworker may insert a tool into the recess 8E on the top end 8C of the first support shaft 8A (e.g., an Allen wrench key or similar tool of the like that matches the top end recess 8E) to keep the first support shaft 8A stable and free from rotating in place. Similarly, second support shaft 8B operably engages with the base 2 in a substantially similar manner as to how the support shaft 8A operably engages with the base 2.

Once configured, the woodworker then determines whether woodworker's band saw ("BT" in FIGS. 14-15 and 16-19) requires the guide arm 10 to be in the first structural arrangement or second structural arrangement (as discussed above). If the first structural arrangement is desired, the woodworker inserts the first support shaft 8A and the second support shaft 8B through the second pair of openings 10E, 10F of the set of openings 10C, 10D, 10E, 10F defined in the guide arm 10 (see FIGS. 14-15 and 16-18). If the second structural arrangement is desired, the woodworker inserts the first support shaft 8A and the second support shaft 8B through the first pair of openings 10C, 10D of the set of openings 10C, 10D, 10E, 10F (see FIG. 19).

Once the first support shaft 8A and second support shaft 8B are engaged with the guide arm 10, the woodworker may then set the guide arm 10 to a desired height based on the thickness of the work piece being cut. As best seen in FIG. 17, the woodworker may slide or vertically move the guide arm 10 along the first support shaft 8A and the second support shaft 8B to the desired height. It should be understood that the guide arm 10 may be moveable along first support shaft 8A and the second support shaft 8B for guiding a work piece defining a thickness between about one-quarter of an inch up to four inches. Once at the desired height, the woodworker may then secure the guide arm 10 with the first support shaft 8A and the second support shaft 8B at the desired height by tightening the height adjustment knobs 10M, 10N into the corresponding openings of the set of apertures 10G, 10H, 10I, 10J. In one instance, the height adjustment knobs 10M, 10N are threadably engaged with the second pair of apertures 10I, 10J of the set of apertures 10G, 10H, 10I, 10J when the first and second support shafts 8A, 8B and the guide arm 10 are provided in the first structural arrangement (see FIGS. 1 and 14-15, 16-18). In another instance, the height adjustment knobs 10M, 10N are threadably engaged with the first pair of apertures 10G, 10H of the set of apertures 10G, 10H, 10I, 10J when the first and second support shafts 8A, 8B and the guide arm 10 are provided in the second structural arrangement (see FIG. 19).

Figure 15:
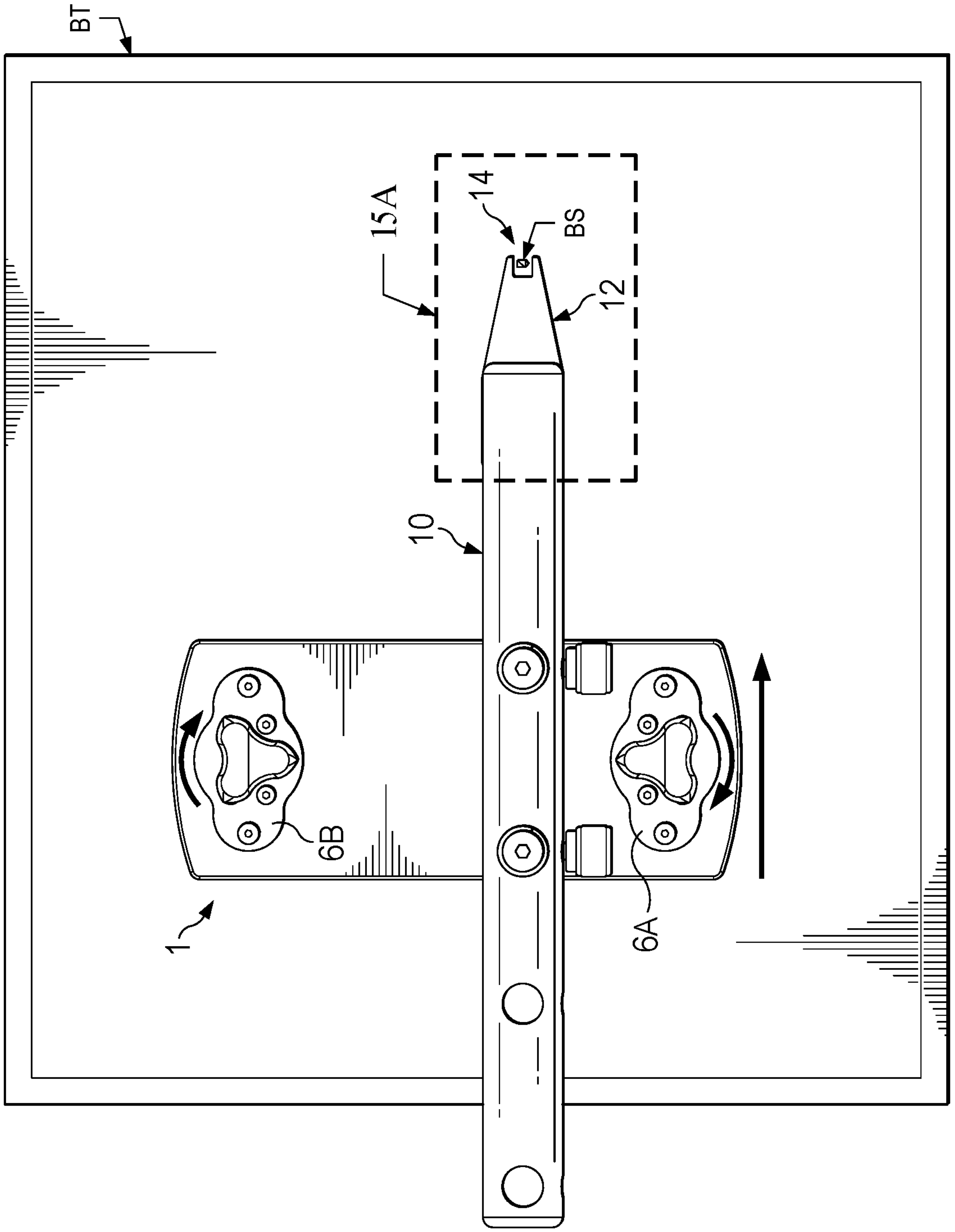
FIG. 15 (FIG. 15) is another operational view similar to FIG. 14, but a third section inset of a guide end is aligned with the band saw and the band saw template jig is secured onto a work surface.
Figure 15A:
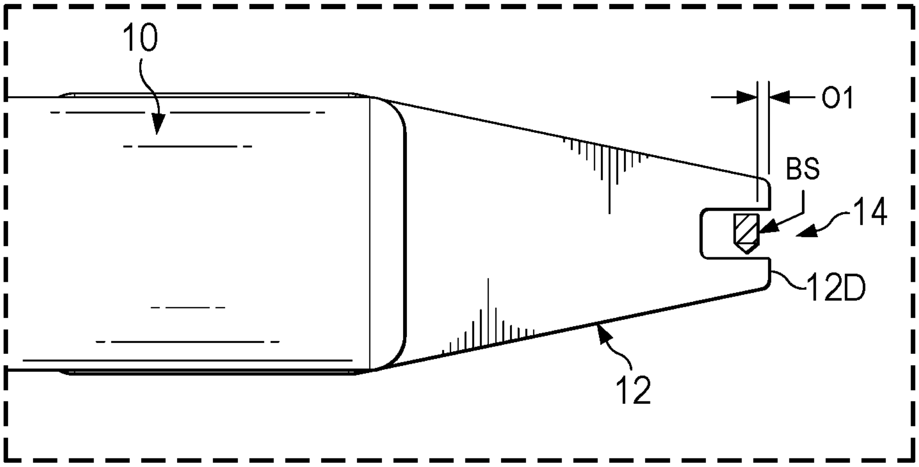
FIG. 15A (FIG. 15A) is an enlargement of the highlighted region shown in FIG. 15, wherein a front end of a guide end is positioned at a first offset from a band saw blade.
Figure 15B:
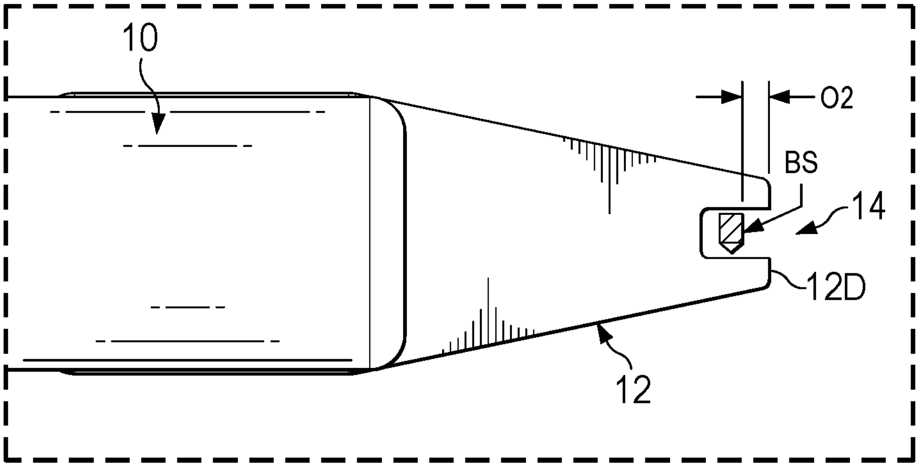
FIG. 15B (FIG. 15B) is another enlargement of the highlighted region shown in FIG. 15, wherein the front end of a guide end is positioned at a second offset from the band saw blade.

Once the desired height is set for the guide arm 10, the woodworker may then set the desired depth or offset of cutting of the band saw template jig 1 relative to a band saw blade of the band saw. As best seen in FIG. 15, a portion of the band saw blade (labeled "BS" in FIGS. 15-19) of the band saw is housed inside of the notch 14 of the guide end 12 in order to set a desired depth or offset for cutting into an irregularly shaped work piece relative to a template (labeled "BS" in FIGS. 16-18). In one instance, the band saw blade may be positioned a first offset (labeled "O1" in FIG. 15A). In another instance, the band saw blade may be positioned a second offset (labeled "O2" in FIG. 15B). It should be appreciated that the band saw blade may be positioned at a distance relative to the front end 12D from about one-sixteenth of an inch up to about one-quarter of an inch for offsetting the band saw blade.

It should be understood that the woodworker may need to adjust the bearing guides of the band saw once the desired offset is determined by the woodworker. Such adjustment may be needed if the band saw blade touches or interferes with the guide end 12 inside of the notch 14. Such touching or interference with the guide end 12 may create damage or marring inside of the guide end 12 as well as damage to the band saw blade.

Once the desired depth or offset of band saw blade is met, the woodworker may then operably engage the base 2 with the band saw table via one or both of the first securement member 6A and the second securement member 6B. In this instance, the woodworker would tighten the first securement member 6A and the second securement member 6B to the band saw table until the first securement member 6A and the second securement member 6B are magnetically engaged with the band saw table. It should be appreciated that the woodworker may also loosen and retighten the first securement member 6A and the second securement member 6B with the band saw table if desired depth or offset needs to be changed during cutting operations.

Figure 16:
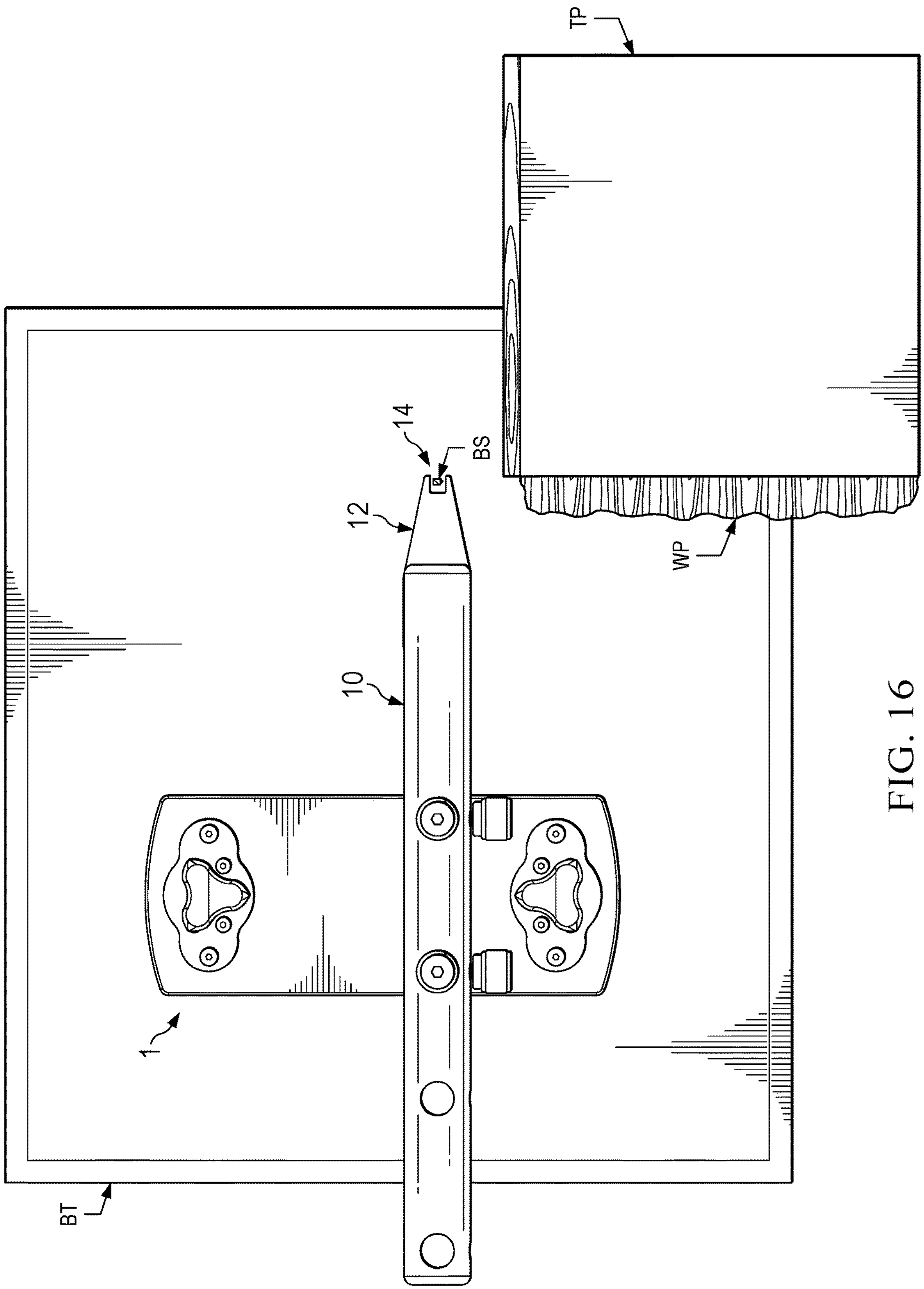
FIG. 16 (FIG. 16) is another operational view of the band saw template jig operably engaged to the band saw, wherein the work piece and template are introduced to the band saw.
Figure 17:
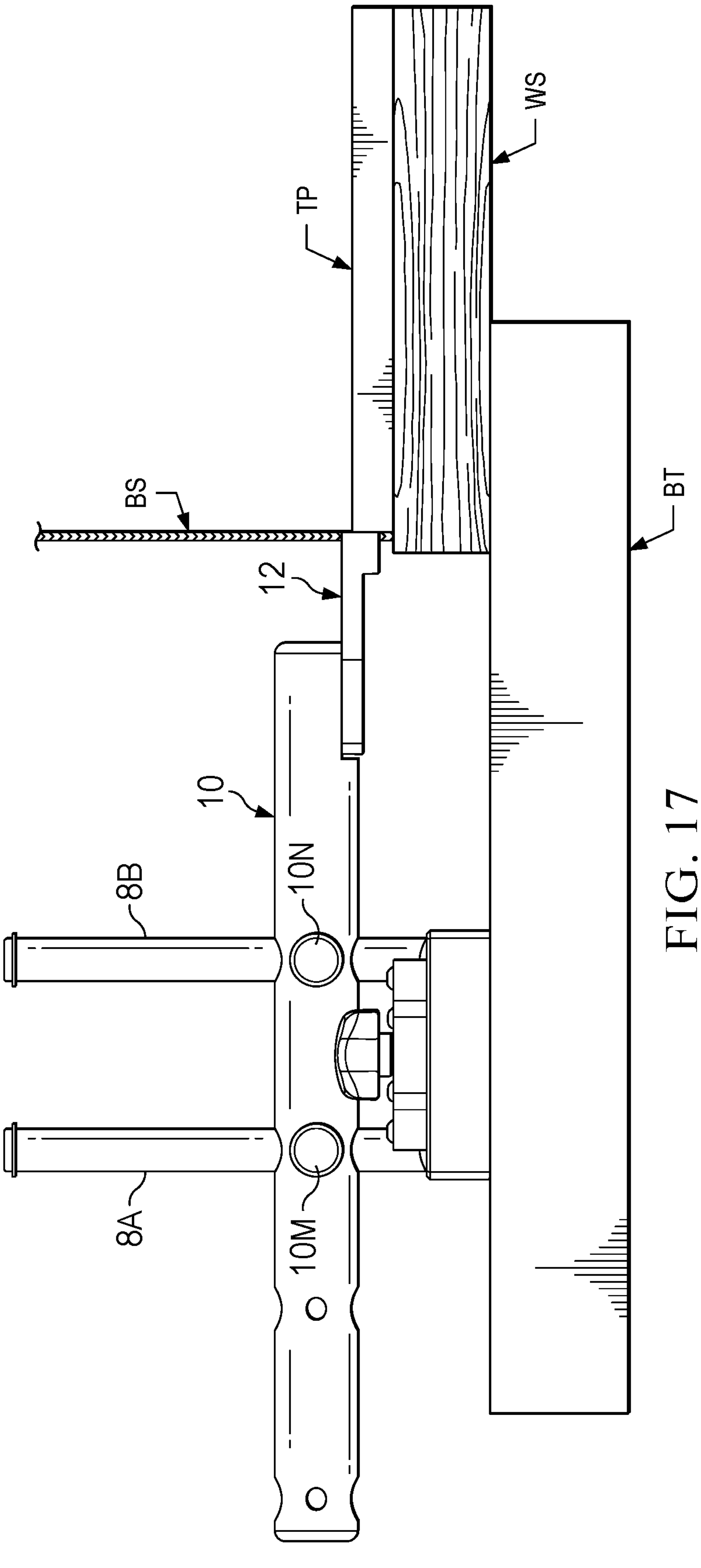
FIG. 17 (FIG. 17) is another operational view of the band saw template jig operably engaged to the band saw, wherein the guide end directly abuts an outer edge of the template.
Figure 18:
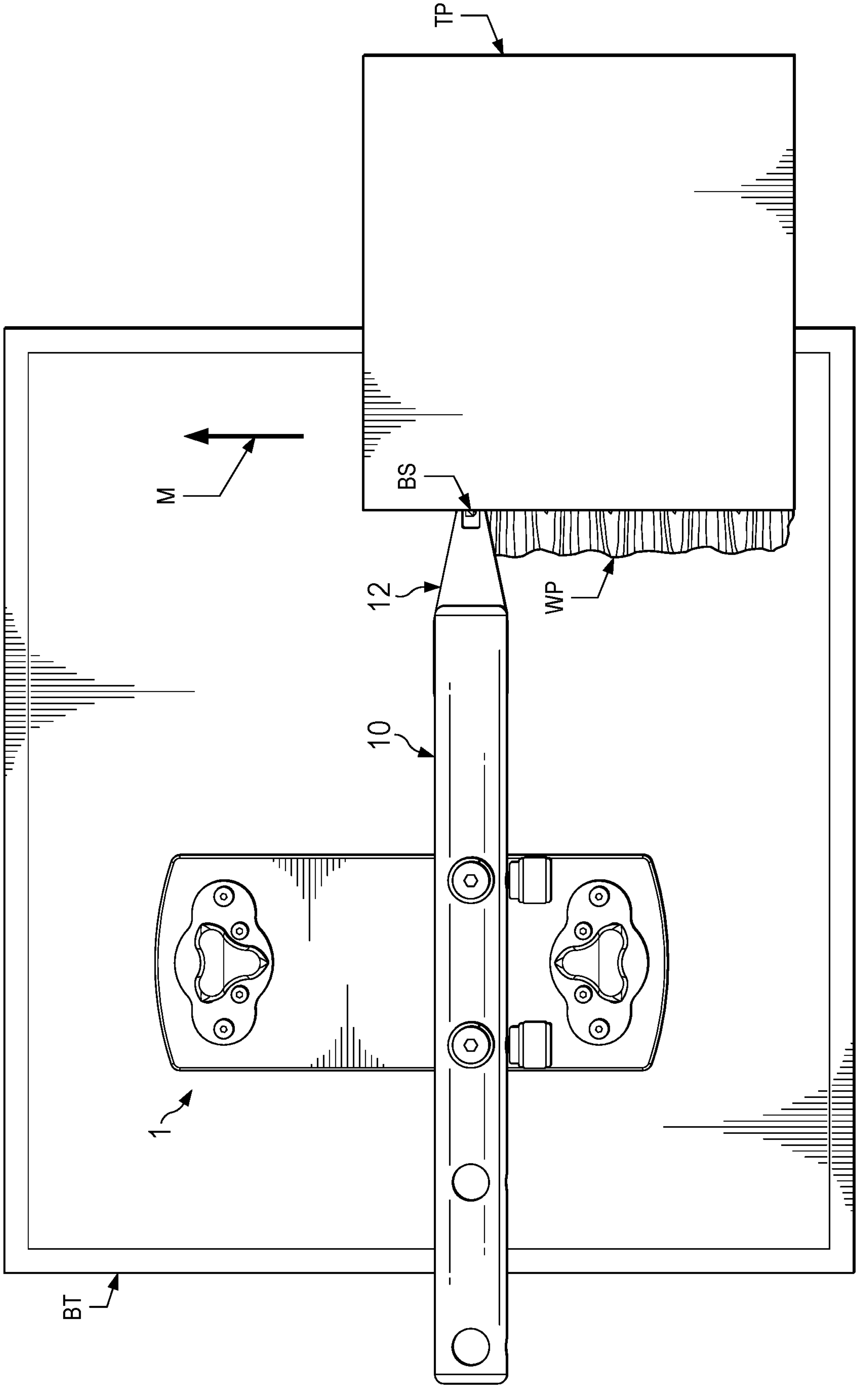
FIG. 18 (FIG. 18) is another operational view of the band saw template jig operably engaged to the band saw, wherein the template rides along the guide end to cut the work piece at a desired depth or offset.

Once the band saw template jig 1 is secured with the band saw table, the woodworker may then introduce the work piece (labeled "WP" in FIGS. 16-18) to the band saw and the band saw template jig 1 (see FIG. 16). Once introduced, the front end 12D of the guide end 12 directly abuts up against an outer edge of an attached template (labeled "TP" in FIGS. 16-18) for forming the desired edge along the irregularly shaped work piece (see FIG. 17). The woodworker may collectively move the work piece through the band saw blade while the outer edge of the template rides along the front end 12D of the guide end 12; such collective movement of the template and the work piece is denoted by an arrow labeled "M" in FIG. 18). The woodworker may continue to collectively move the work piece through the band saw blade with the outer edge of the template riding along the front end 12D of the guide end 12 until a first side is cut into the work piece. The woodworker may repeat this guiding process with the band saw template jig 1 if the woodworker desires to cut one or more sides of the work piece.

Figure 14:
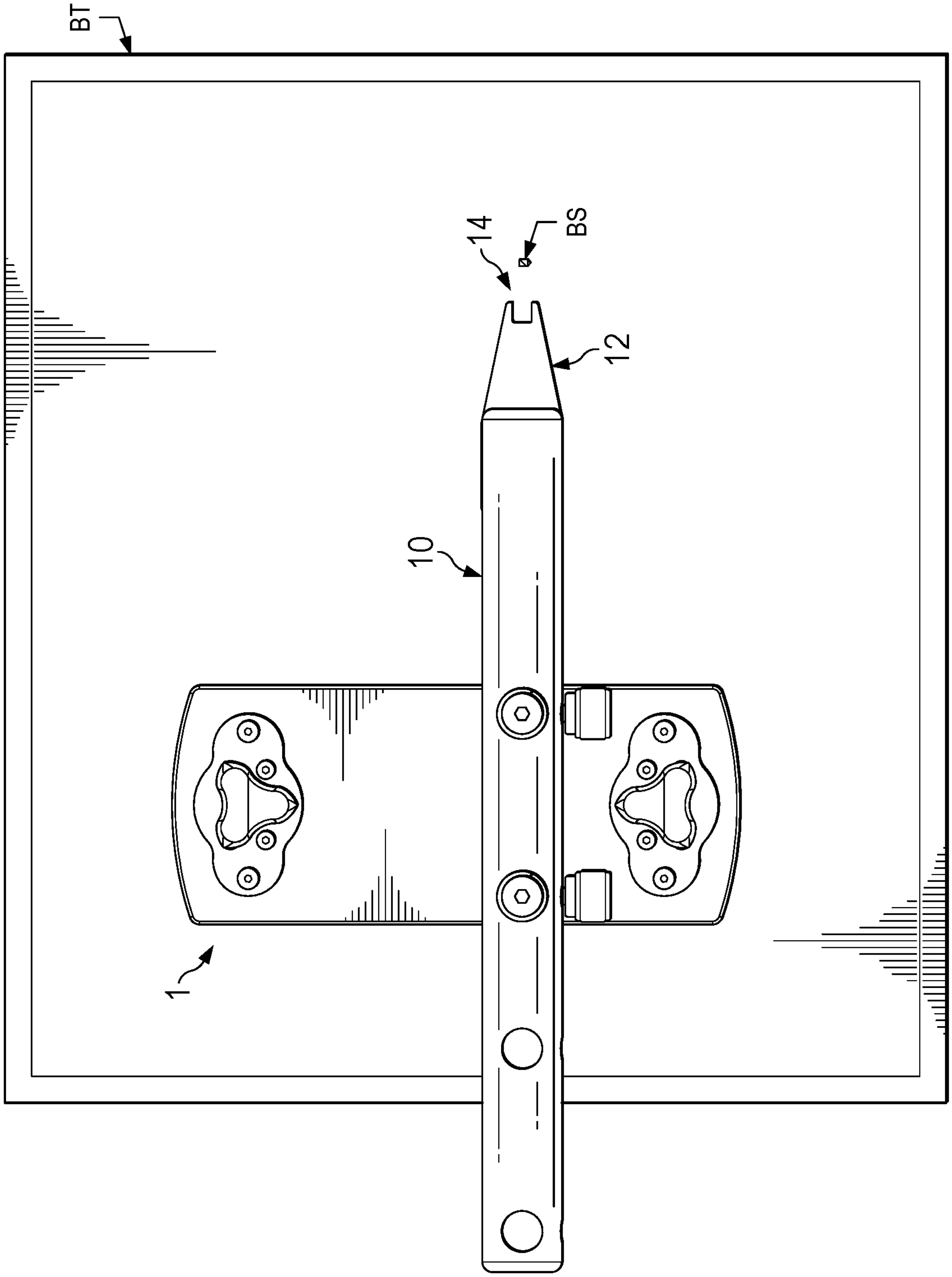
FIG. 14 (FIG. 14) is an operational view of the band saw template jig, wherein the band saw template jig is placed onto a work surface of a band saw.
Figure 14A:
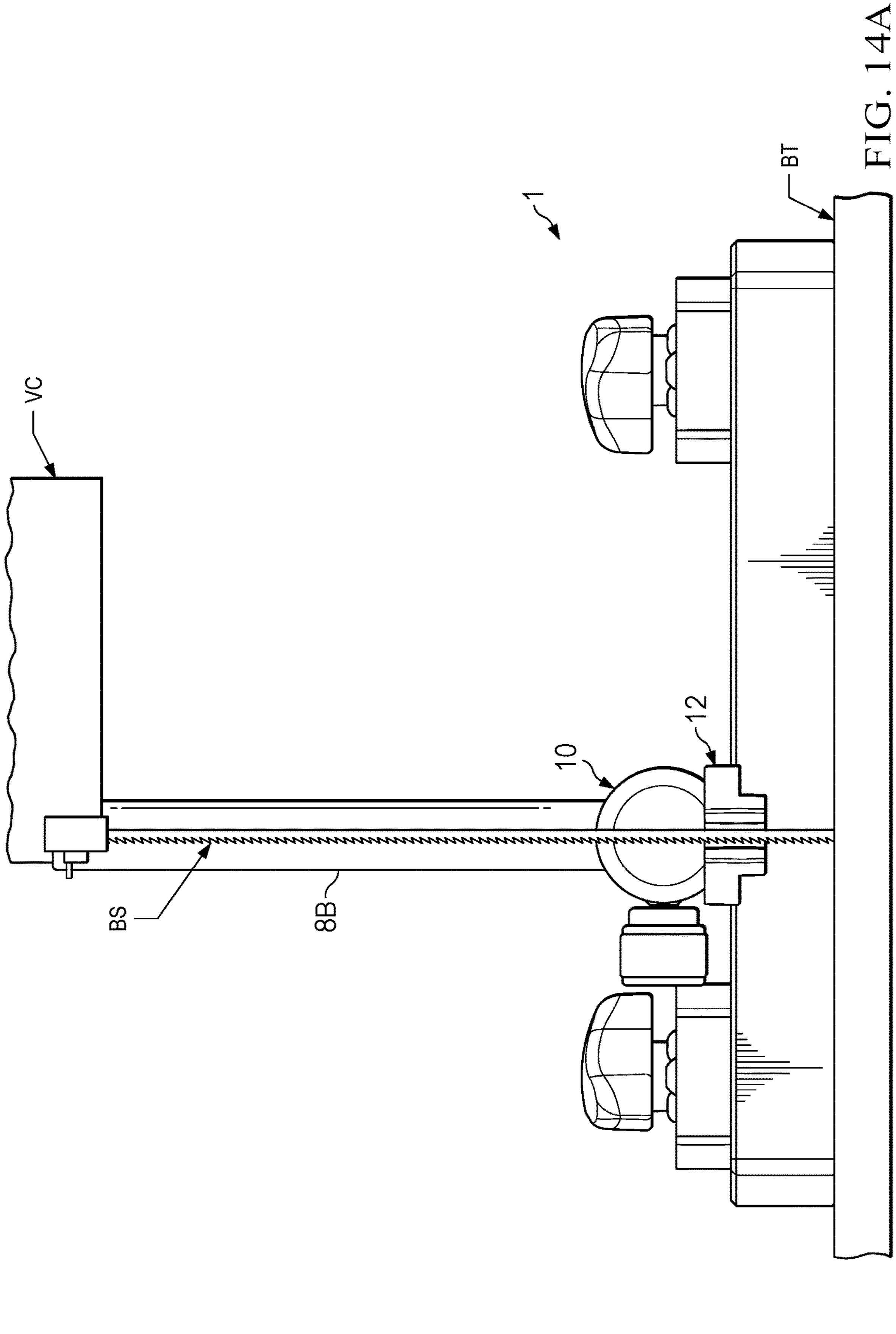
FIG. 14A (FIG. 14A) is another operational view similar to FIG. 14, but the guide arm of the band saw template jig is offset from a vertical column of a band saw.

During a cutting operation, it should be appreciated that the guide arm 10 of band saw template jig 1 may be offset relative to a vertical column (labeled "VC" in FIG. 14A) of the band saw based on the structural configuration of the base 2 and the guide arm 10. As best seen in FIG. 14A, the guide arm 10 is offset from the vertical column of the band saw in which the guide arm 10 is positioned forwardly of the vertical column yet aligned with the band saw blade of the band saw. Additionally, the base 2 of the band saw template jig 1 may also be aligned with or centered to the vertical column of the band saw during a cutting operation. Such alignment between the band saw template jig 1 and the vertical column of the band saw minimizes interference between the base 2 and the combination of the workpiece and the template as the combination of the workpiece and the template pass through the band saw blade. As such, the guide arm 10 is offset at a suitable distance away from the vertical column to allow the woodworker to freely move and rotate the workpiece and the template through the band saw blade without interference from the base 2. It should be understood that the vertical column of the band saw shown in FIG. 14A is diagrammatically shown for simplicity and brevit.

After the cuts are completed, the woodworker may then remove the work piece and the template from band saw and introduce the work piece and the template to a bearing guide router. If desired, the woodworker may then make a second cut into the work piece by the bearing guided router to ensure the work piece is cut to the exact pattern of the template.

Figure 20:
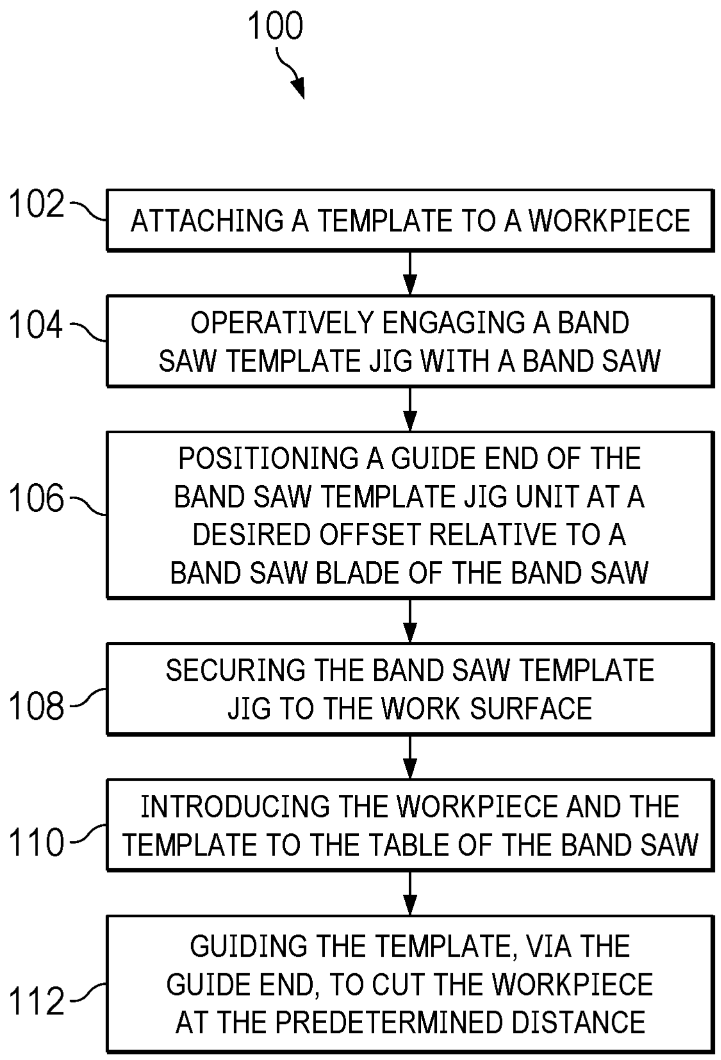
FIG. 20 (FIG. 20) is a method flowchart for guiding a template to cut a work piece.

FIG. 20 illustrates a method 100 for guiding a template to cut a work piece. An initial step 102 of method 100 includes attaching a template to a work piece. Another step 104 of method 100 includes operatively engaging a band saw template jig with a band saw. Another step 106 of method 100 includes positioning a guide end of the band saw template jig unit at a desired offset relative to a band saw blade of the band saw. Desired offset may be equal to about one-sixteenth of an inch up to about one-quarter of an inch. Another step 108 of method 100 includes securing the band saw template jig to the work surface. Another step 110 of method 100 includes introducing the work piece and the template to the table of the band saw. Another step 112 of method 100 includes guiding the template, via the guide end, to cut the work piece at the predetermined distance.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A band saw template jig, comprising:
a base;
at least one a support shaft operably engaged with the base;
a guide arm selectively operatively engageable with the at least one support shaft; and
a guide end defining a notch and operably engaged with the guide arm;
wherein the notch is adapted to house a portion of a band saw blade for setting a desired offset between a work piece and an attached template;
wherein the support shaft comprises:
a top end;
a bottom end opposite to the top end and operably engaged with the base;
a vertical direction extending between the top end and the bottom end; and
wherein the guide arm and guide end are collectively moveable along the support shaft between the top end and a top surface of the base; and
wherein the guide arm comprises:
a first end;
a second end opposite to the first end;
a set of openings defined in the guide arm between the first end and the second end; and
wherein the set of openings is configured to receive and house at least a portion of the at least one support shaft.

2. The band saw template jig according to claim 1, wherein the notch defines a depth measured from a tip of the guide end to a base wall of the guide end; and
wherein the portion of the band saw blade is positioned between the tip and the base wall.

3. The band saw template jig according to claim 1, wherein the notch defines a width measured by a distance between a pair of internal lateral walls of the guide end; and
wherein the notch is adapted to house a band saw blade having a width between one-eighth of an inch up to one-fourth of an inch.

4. The band saw template jig according to claim 3, further comprising: at least one height adjustable knob configured to secure the guide arm at a desired height relative to the base.

5. The ban saw template jig according to claim 4, further comprising:
a first distance measured between the guide end and the base when the support shaft is engaged with the guide arm at the first pair of openings;
a second distance measured between the guide end and the base when the support shaft is engaged with the guide arm at the second pair of openings; and
wherein the second distance is greater than the first distance.

6. The band saw template jig according to claim 4, wherein the guide arm further comprises:
a set of apertures defined in the guide arm and is in fluid communication with the set of openings; and
wherein the at least one height adjustable knob threadably engages with the guide arm inside one of the apertures of the set of apertures to secure the guide arm with the support shaft.

7. The band saw template jig according to claim 1, wherein the guide arm further comprises:
a first pair of openings defined in the guide arm between the first end and the second end; and
a second pair of openings defined in the guide arm between one of the first end and second end and the first pair of openings.

8. The band saw template jig according to claim 1, further comprising: a second support shaft operably engaged with the base and configured with the base in an identical orientation as to the at least one support shaft.

9. The band saw template jig according to claim 8, wherein the guide arm further comprises:

a first pair of openings extending through the guide arm;

a second pair of openings extending through the guide arm;

wherein each one of the first pair of openings are configured to receive and house at least a portion of the first support shaft or the second support shaft in a first structural arrangement; and wherein each one of the second set of openings are configured to receive and house at least a portion of the first support shaft or the second support shaft in a second structural arrangement.

10. The band saw template jig according to claim 1, wherein the guide arm comprises:

an inset configured to operably engage with the guide end.

11. The band saw template jig according to claim 10, wherein the guide end is removably secured to the inset of the guide arm via at least one guide end fastener.

12. The band saw template jig according to claim 1, further comprising:

at least one securement member operably engaged with the base and operatively engageable with a band saw table.

13. The band saw template according to claim 12, wherein the at least one securement member magnetically engages the base.

* * * * *